United States Patent
Shapsa et al.

(10) Patent No.: US 10,243,815 B2
(45) Date of Patent: Mar. 26, 2019

(54) METHODS AND SYSTEMS TO EVALUATE DATA CENTER RESOURCE ALLOCATION COSTS

(71) Applicant: VMware, Inc., Palo Alto, CA (US)

(72) Inventors: Lior Shapsa, Herzliya (IL); Mayan Negbi, Herzliya (IL); Uri Kochavi, Herzliya (IL); Nadav Yakar, Herzliya (IL); Elad Swisa, Herzliya (IL); Yochai Uliel, Herzliya (IL); Guy Ginzburg, Herzliya (IL); Yardena Meymann, Herzliya (IL); Ram Janovski, Herzliya (IL)

(73) Assignee: VMWARE, INC., Palo Alto, CA (US)

( * ) Notice: Subject to any disclaimer, the term of this patent is extended or adjusted under 35 U.S.C. 154(b) by 868 days.

(21) Appl. No.: 14/754,232

(22) Filed: Jun. 29, 2015

(65) Prior Publication Data

US 2016/0380862 A1 Dec. 29, 2016

(51) Int. Cl.
*G06F 15/173* (2006.01)
*H04L 12/26* (2006.01)
*H04L 12/24* (2006.01)
*G06Q 10/00* (2012.01)

(52) U.S. Cl.
CPC ............ *H04L 43/04* (2013.01); *G06Q 10/00* (2013.01); *H04L 41/145* (2013.01); *H04L 43/0817* (2013.01); *H04L 43/16* (2013.01)

(58) Field of Classification Search
CPC ...................................................... H04L 43/16
See application file for complete search history.

(56) References Cited

U.S. PATENT DOCUMENTS

| | | | |
|---|---|---|---|
| 8,762,531 B1* | 6/2014 | Yemini | G06Q 10/06 340/1.1 |
| 2004/0032857 A1* | 2/2004 | Tannan | H04L 41/145 370/351 |
| 2004/0193476 A1* | 9/2004 | Aerdts | G06Q 10/06 705/7.29 |
| 2005/0076112 A1* | 4/2005 | Ravindran | G06F 9/465 709/224 |
| 2005/0154576 A1* | 7/2005 | Tarui | H04L 41/0853 703/22 |
| 2007/0245004 A1* | 10/2007 | Chess | H04L 41/145 709/223 |
| 2008/0104230 A1* | 5/2008 | Nasuto | G06F 11/3419 709/224 |
| 2008/0270526 A1* | 10/2008 | Barnett | H04L 67/10 709/203 |
| 2009/0187713 A1* | 7/2009 | Zedlewski | G06F 11/3409 711/130 |

(Continued)

*Primary Examiner* — Razu A Miah
(74) *Attorney, Agent, or Firm* — Thomas | Horstemeyer, LLP

(57) ABSTRACT

This disclosure is directed to methods and systems to evaluate resource allocation costs of a data center. Methods and systems compute resource allocation costs of a cloud computing industry to obtain industry benchmarks that are compared with the resource allocation costs of the data center. The comparisons enable IT managers to objectively identify computational resource shortages, resource over investments, and where future investment in computational resources should be made for the data center.

27 Claims, 22 Drawing Sheets

(56) References Cited

U.S. PATENT DOCUMENTS

| | | | | |
|---|---|---|---|---|
| 2010/0010944 A1* | 1/2010 | Cheng | G06F 17/30032 | 706/12 |
| 2010/0070784 A1* | 3/2010 | Gupta | G06F 1/3203 | 713/310 |
| 2010/0306382 A1* | 12/2010 | Cardosa | G06F 9/5044 | 709/226 |
| 2011/0295939 A1* | 12/2011 | Andrade | G06F 9/548 | 709/203 |
| 2011/0307889 A1* | 12/2011 | Moriki | G06F 9/45558 | 718/1 |
| 2012/0102193 A1* | 4/2012 | Rathore | G06F 9/06 | 709/224 |
| 2012/0221730 A1* | 8/2012 | Oba | G06F 9/5077 | 709/226 |
| 2013/0019015 A1* | 1/2013 | Devarakonda | G06F 9/5072 | 709/226 |
| 2013/0042003 A1* | 2/2013 | Franco | H04L 67/1097 | 709/226 |
| 2014/0039965 A1* | 2/2014 | Steven | G06Q 10/06315 | 705/7.25 |
| 2014/0136688 A1* | 5/2014 | Kopri | H04L 43/04 | 709/224 |
| 2014/0337442 A1* | 11/2014 | Zhuang | H04L 51/066 | 709/206 |
| 2016/0147550 A1* | 5/2016 | McWilliams | G06F 21/121 | 718/1 |

* cited by examiner

METHODS AND SYSTEMS TO EVALUATE DATA CENTER RESOURCE ALLOCATION COSTS

TECHNICAL FIELD

The present disclosure is directed to methods and systems to evaluate resource allocation costs of a data center with respect to resource allocation costs of a cloud computing industry.

BACKGROUND

In recent years, enterprises have shifted much of their computing needs from enterprise owned and operated computer systems to cloud computing providers. Cloud computing providers charge enterprises to store and run their applications in a cloud-computing facility and allow enterprises to purchase other computing services in much the same way utility customers purchase a service from a public utility. A typical cloud-computing facility is composed of numerous racks of servers, switches, routers, and mass data-storage devices interconnected by local-area networks, wide-area networks, and wireless communications that may be consolidated into a single data center or distributed geographically over a number of data centers. Enterprises typically run their applications in a cloud-computing facility as virtual machines ("VMs") that are consolidated into a virtual data center ("VDC") also called a software defined data center ("SDDC"). A VDC recreates the architecture and functionality of a physical data center for running an enterprise's applications. Because the vast numbers of VDCs and dynamic nature of VDCs running in a typical cloud-computing facility, VDC's introduce management challenges to information technology ("IT") managers. Many IT managers lack the insight needed to objectively identify computational resource shortages and where future investment in computational resources should be made.

SUMMARY

This disclosure is directed to methods and systems to evaluate resource allocation costs of a data center. Methods and systems compute resource allocation costs of a cloud computing industry to obtain industry benchmarks that are compared with the resource allocation costs of the data center. The comparisons enable IT managers to objectively identify computational resource shortages, resource over investments, and where future investment in computational resources should be made for the data center.

DETAILED DESCRIPTION

Figure 1:
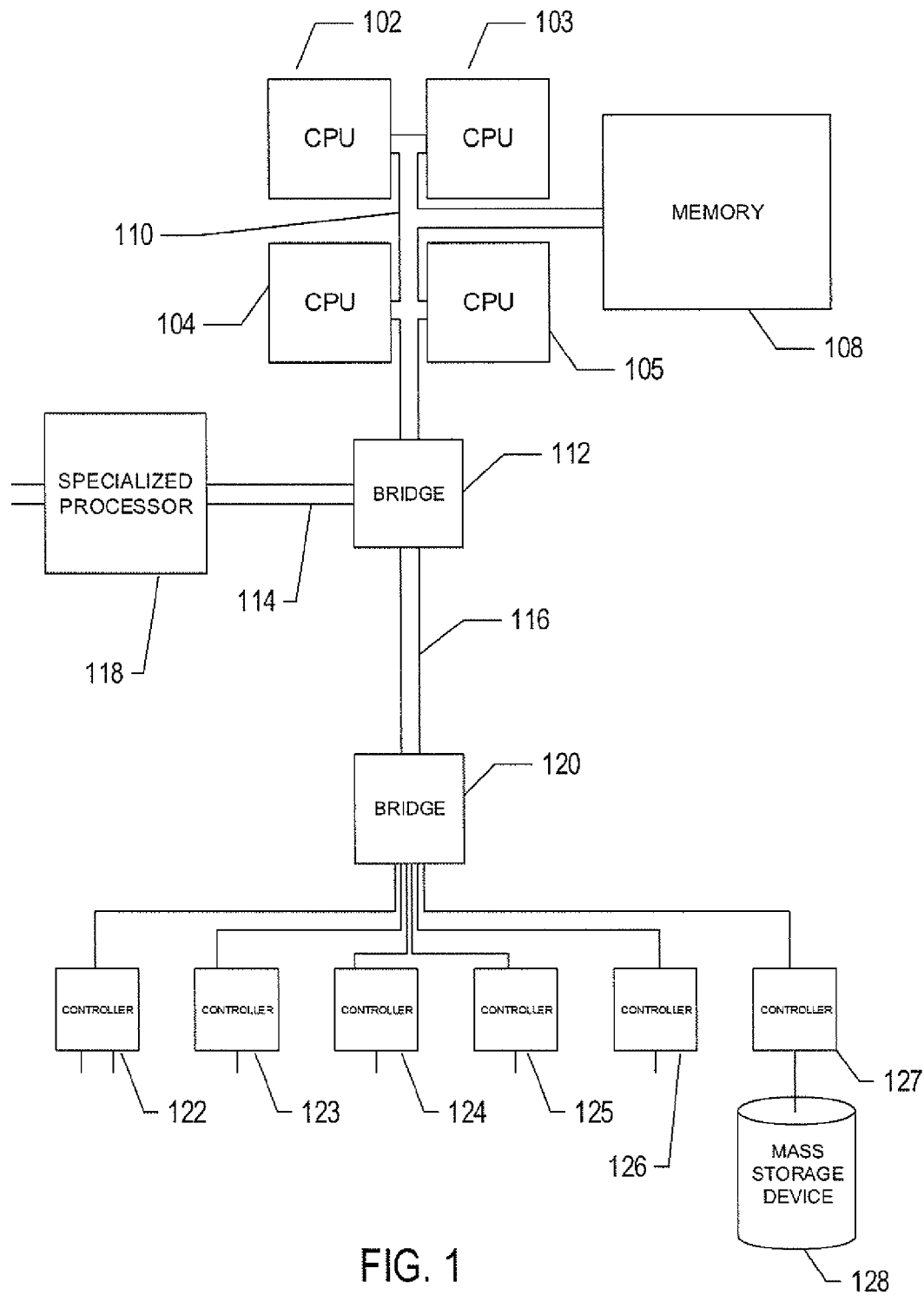
FIG. 1 shows a general architectural diagram for various types of computers.

A general description of physical data centers, hardware, virtualization, virtual machines, and virtual data centers are provided in a first subsection. Computational methods and system to evaluate resource allocation costs of a data center with respect to resource allocation cost of a cloud computing industry are provided in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and VMs, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
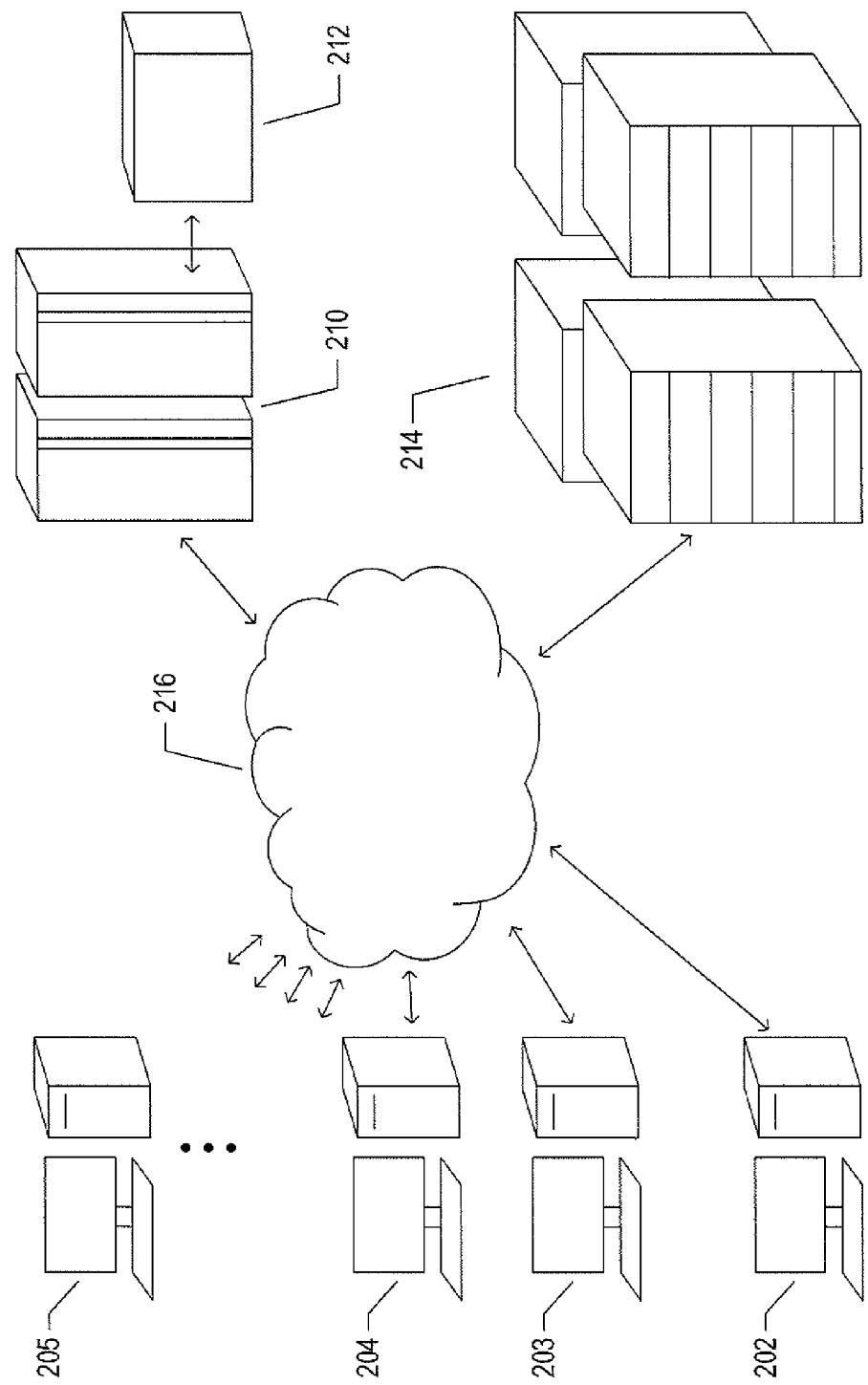
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
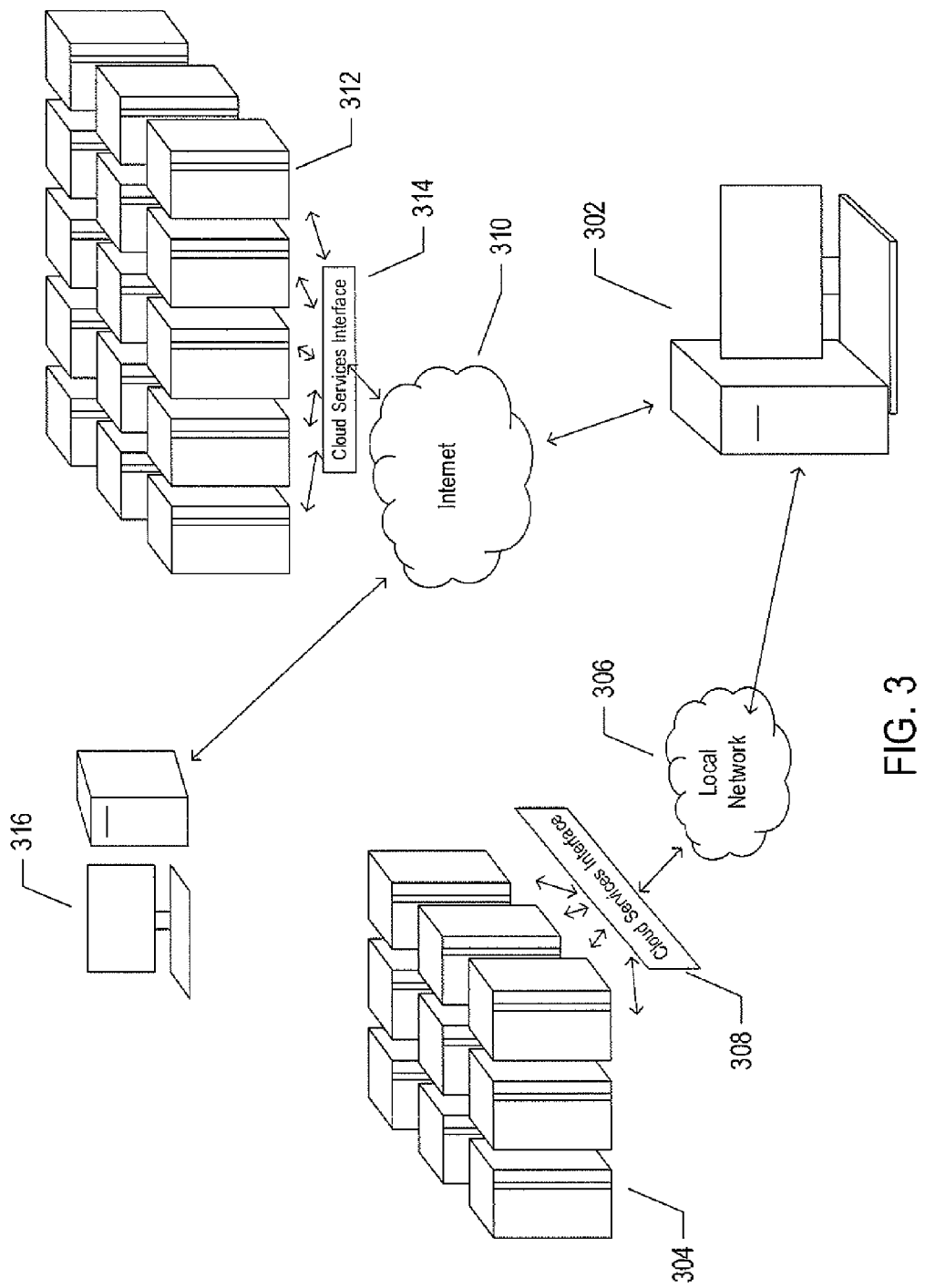
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
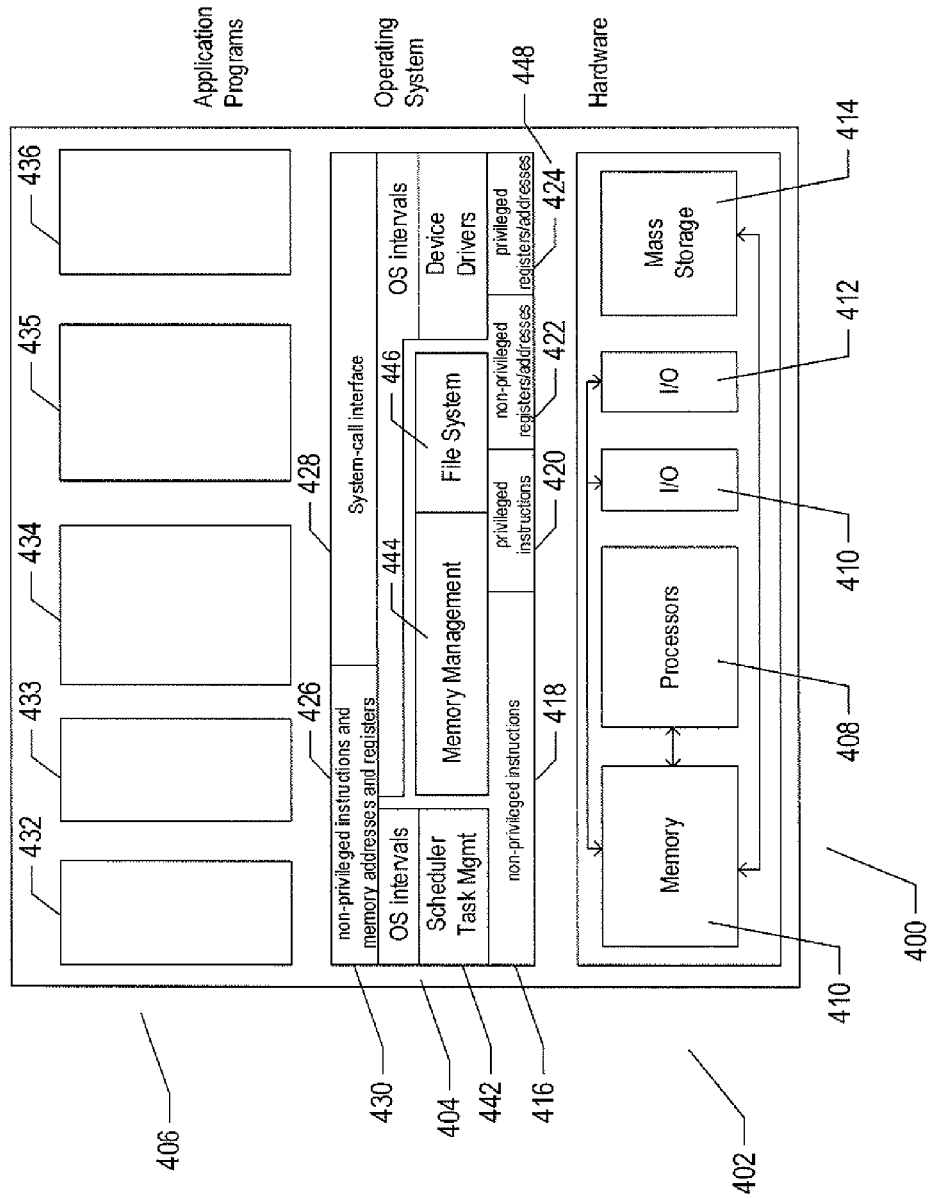
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
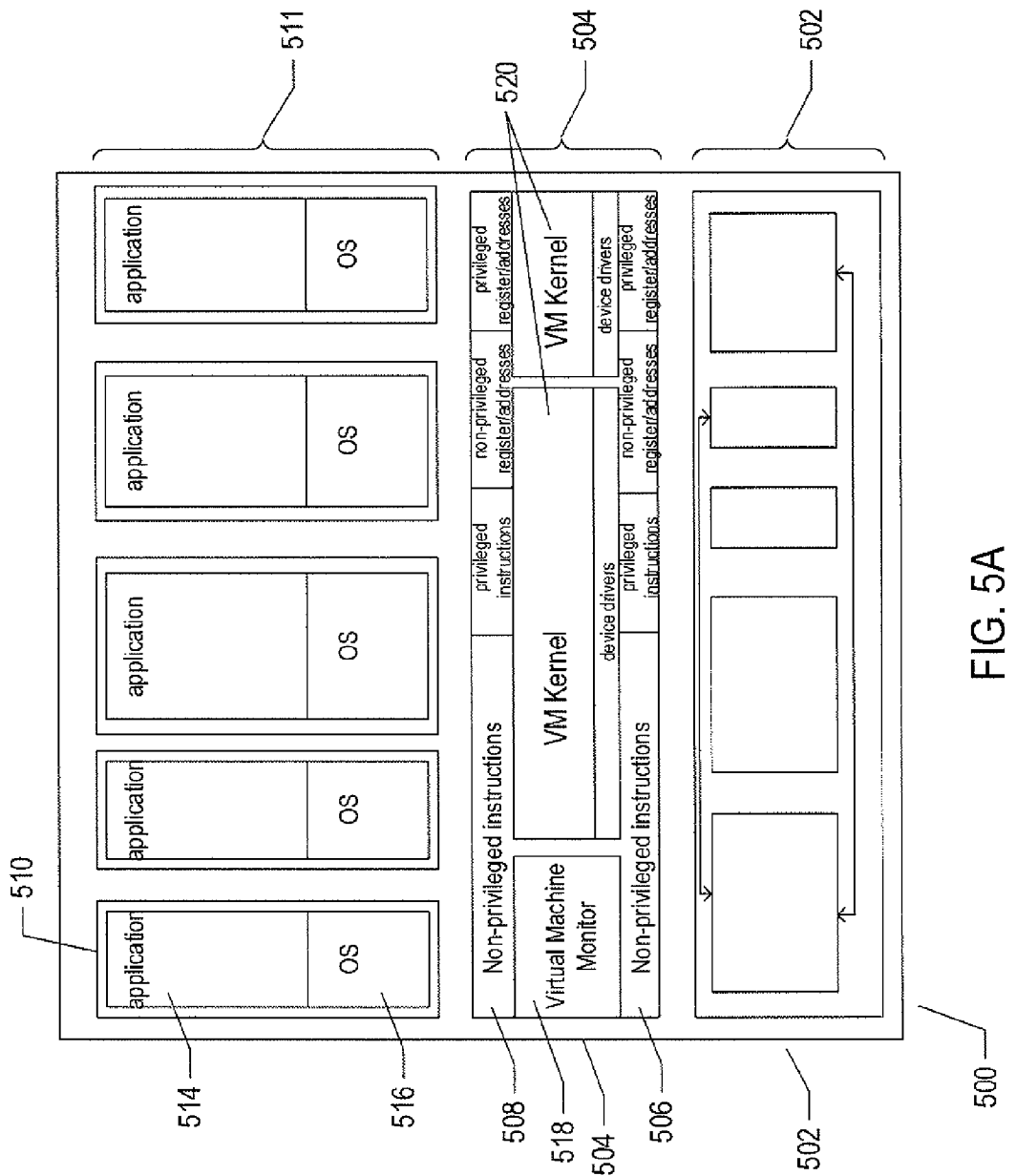
FIGS. 5A-5B show two types of virtual machine and virtual-machine execution environments.
Figure 5B:
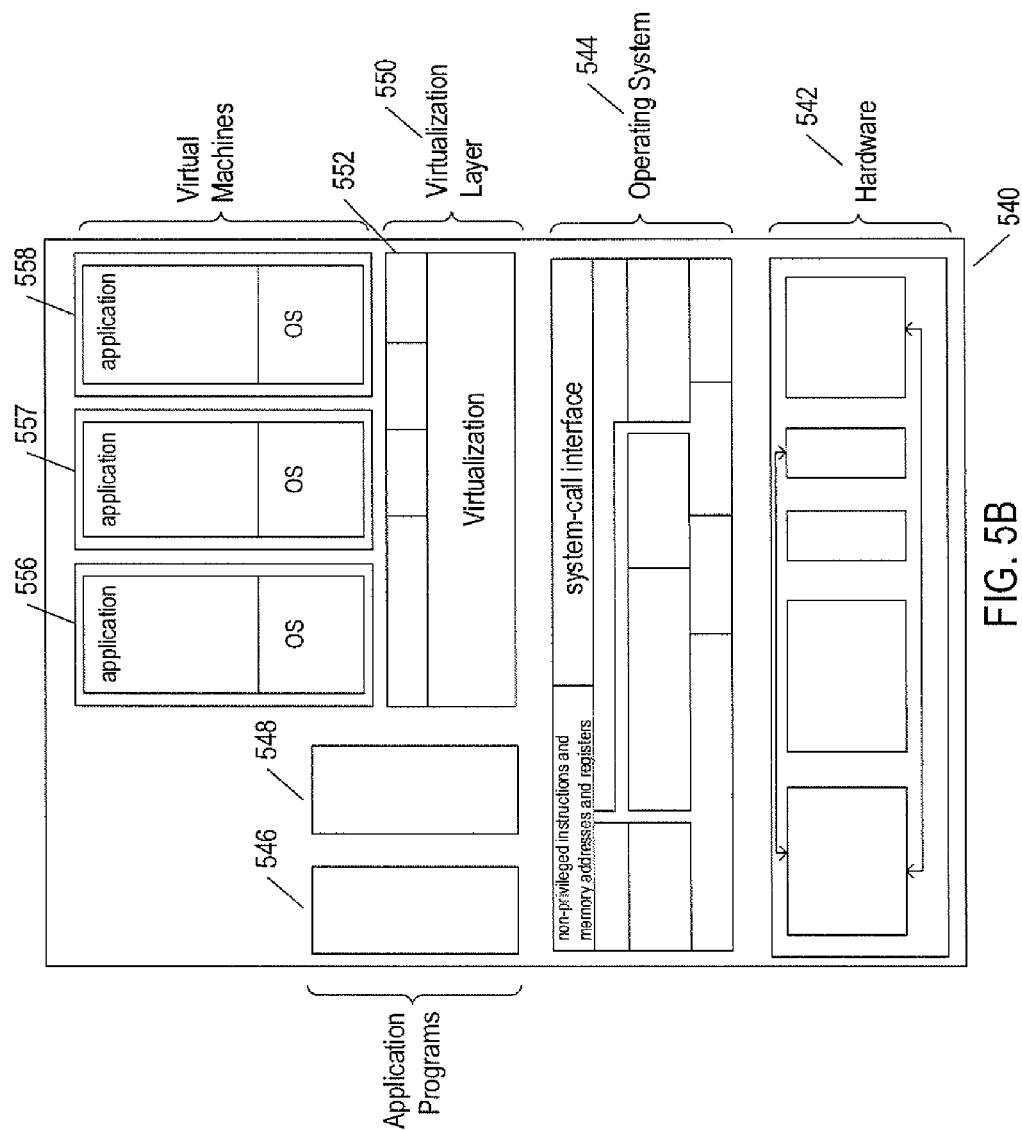

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
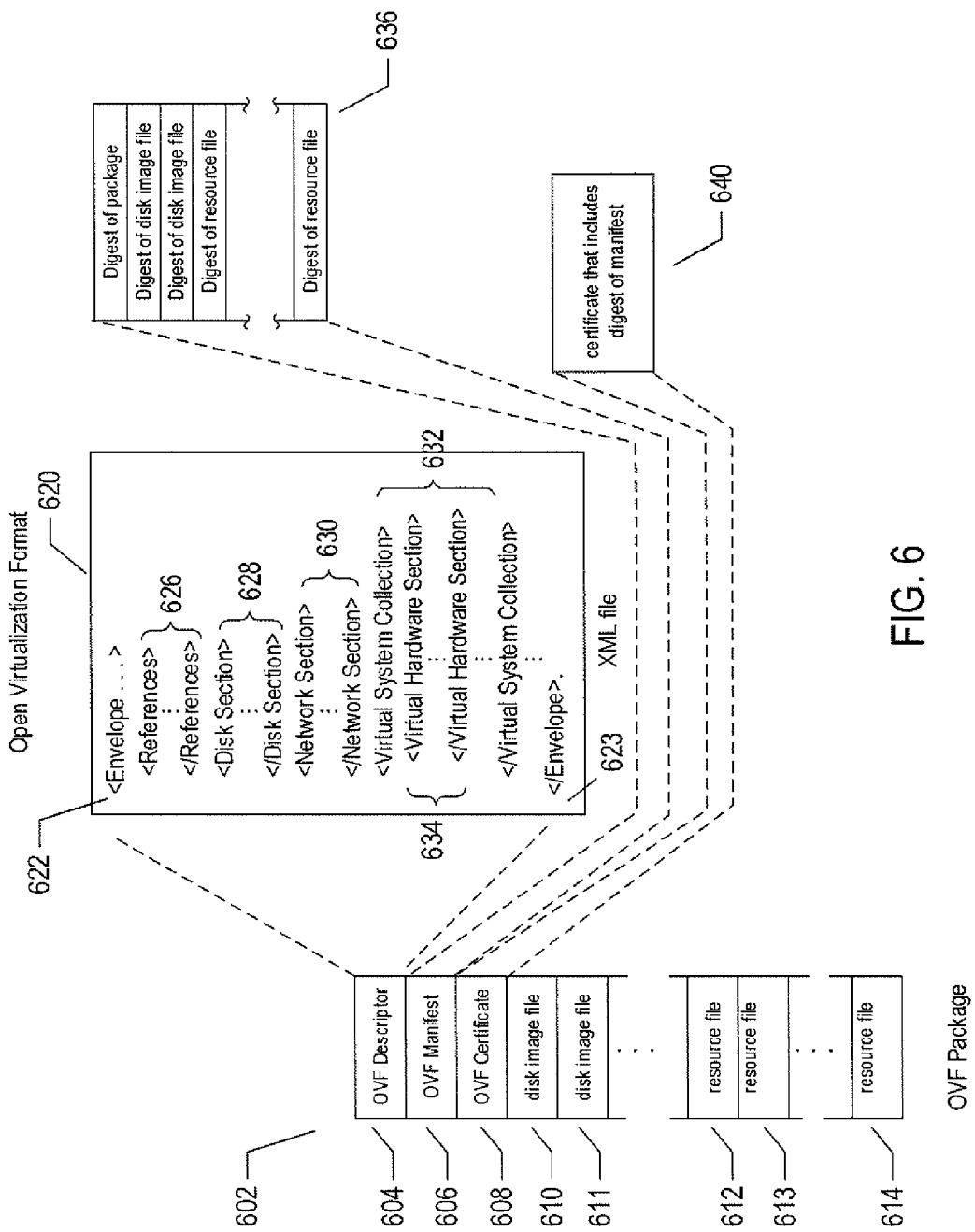
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
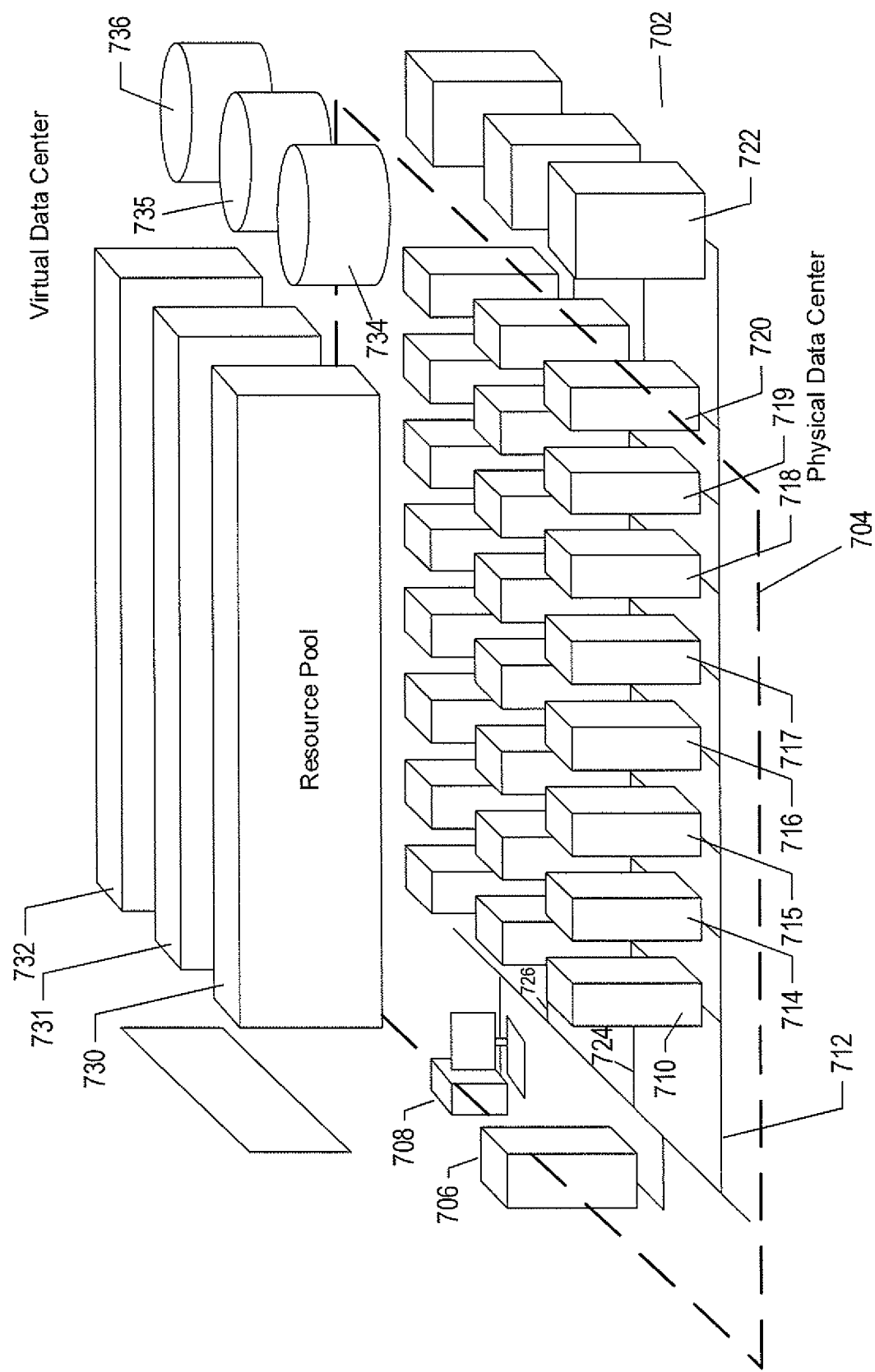
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
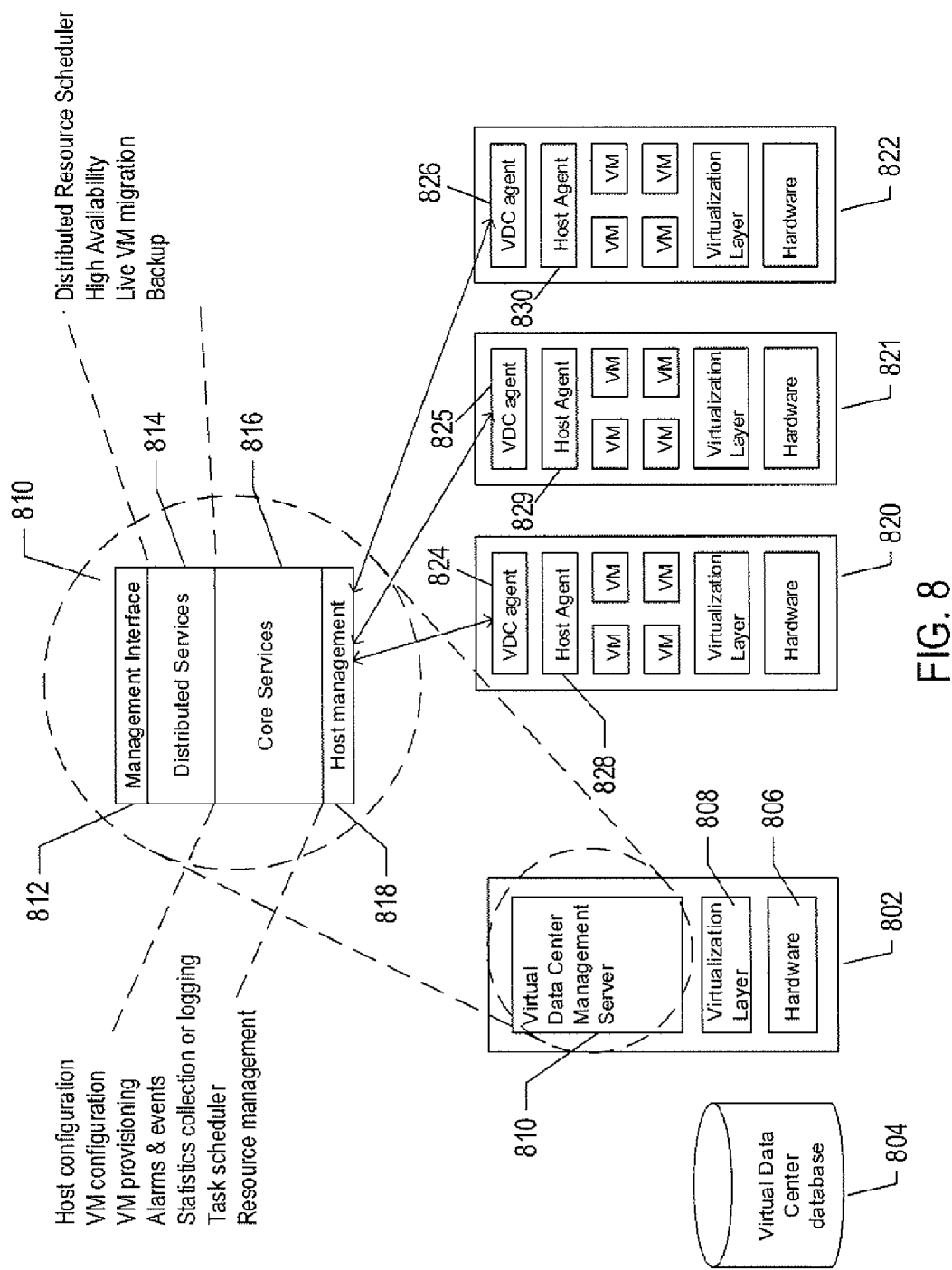
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtualdata-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
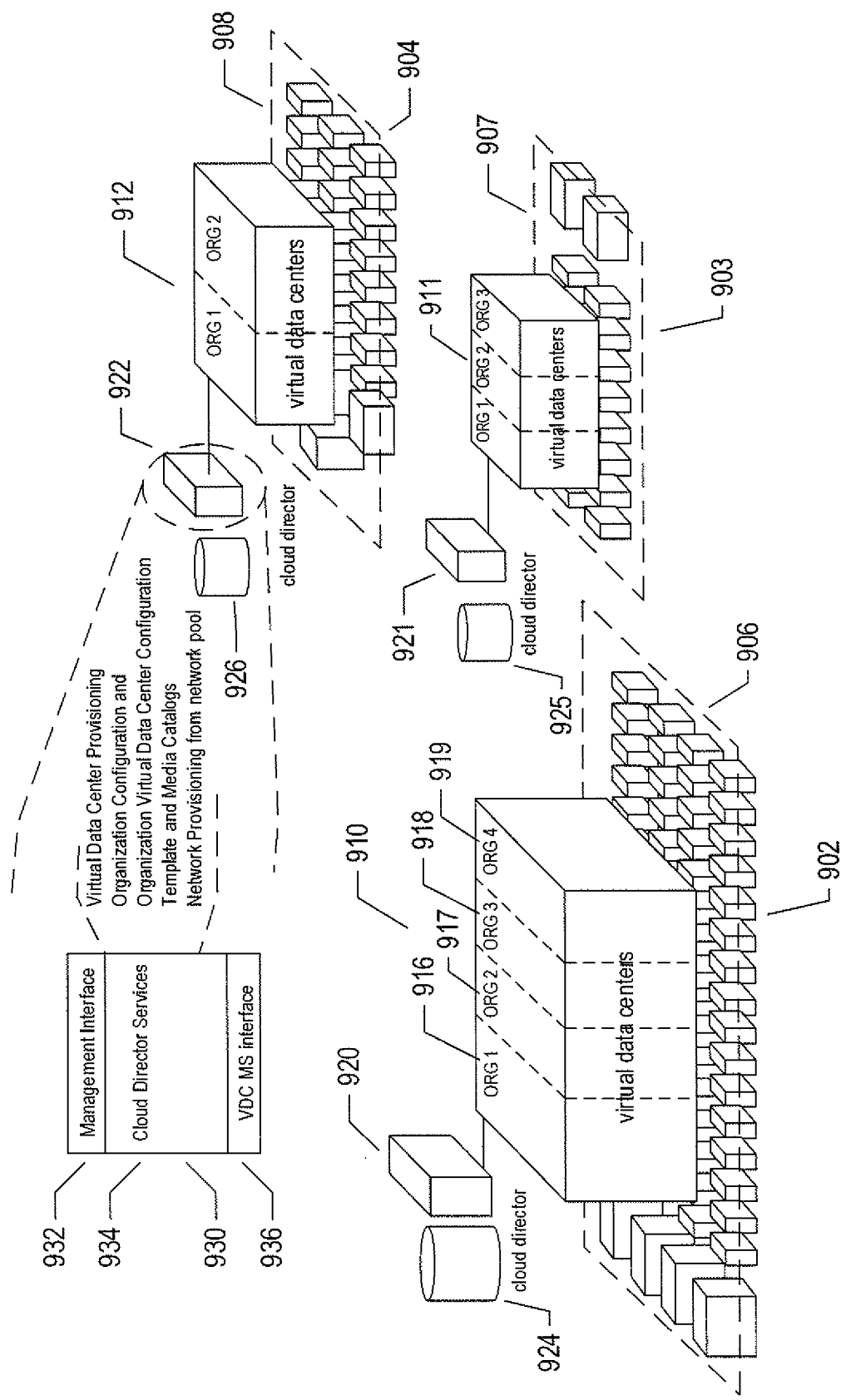
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
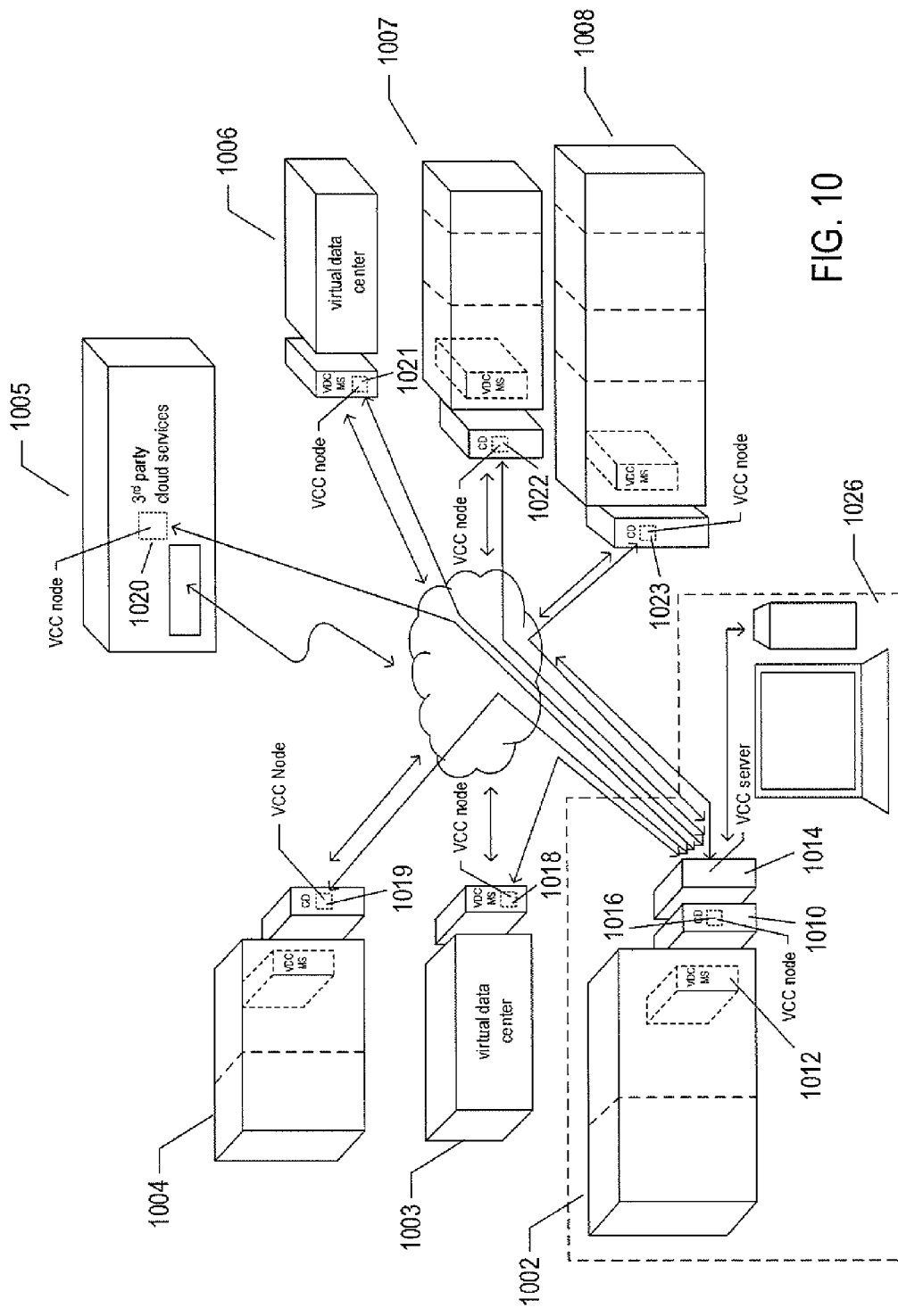
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
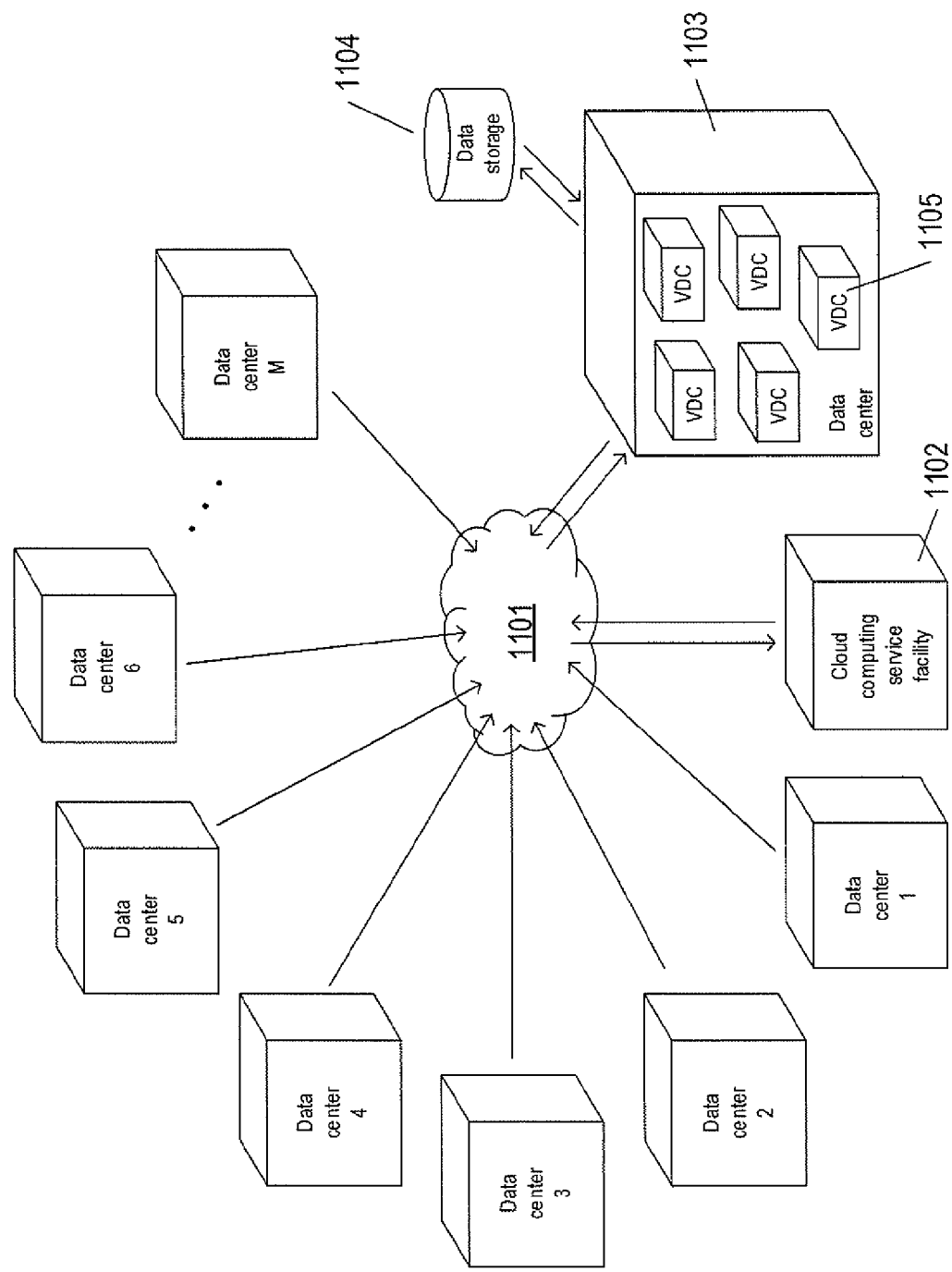
FIG. 11 shows an example of a system to collect cost information from physical data centers that combined represents a cloud computing industry.

Computational Methods and System to Evaluate Resource Allocation Costs of a Data Center with Respect to Resource Allocation Cost of a Cloud Computing Industry FIG. 11 shows an example of a system to collect computational resource costs from M separate physical data centers that combined represents a cloud computing industry. The resources may be CPUs, memory, and data storage. Each of the M physical data centers may be configured as described above with reference to FIG. 7 to run one or more VDCs as described above with reference to FIG. 9. Each physical data center generates log files, configuration files, resource utilization data, such as usage data regarding CPU's, memory, and data storage, and stores the data in one or more data-storage devices. For example, CPU utilization, memory utilization, and data storage utilization by the VMs that run in each of the M physical data centers may be recorded periodically, such as daily, weekly, or monthly. Each of the M physical data centers also compute a total VDC cost of running one or more VDCs. The resource utilization data and total VDC costs may be sent via the Internet 1101 to a cloud computing service facility 1102 that stores the resource utilization data and total VDC cost. A data center 1103 accesses the resource utilization data and total VDC costs of the M physical data centers maintained by the cloud compute service facility 1102 in order to compute resource allocation costs of the cloud computing industry. The resource allocation costs serve as cloud computing industry benchmarks that may be compared with resource allocation costs of the data center 1103. Differences between the allocation cost of the data center 1103 and the allocation costs of the cloud computing industry may be used to adjust operations of the data center 1103 in order to shift allocation cost and total VDC cost of the data center 1103 into closer alignment with the allocation costs and total VDC costs of the cloud computing industry.

The resource utilization data and total VDC costs of the M physical data centers maintained by the cloud computing services facility 1102 may be sent to the data center 1103 on a regular basis, such as daily, weekly, or monthly. The data center 1103 stores the resource utilization data and total VDC costs in a data-storage device 1104. In the example of FIG. 11, the data center 1103 runs three VDC's, such as VDC 1105. One or more of the VDC's may form a private cloud. In the example of FIG. 11, up to three private clouds may be run in the data center 1103.

Figure 12A:
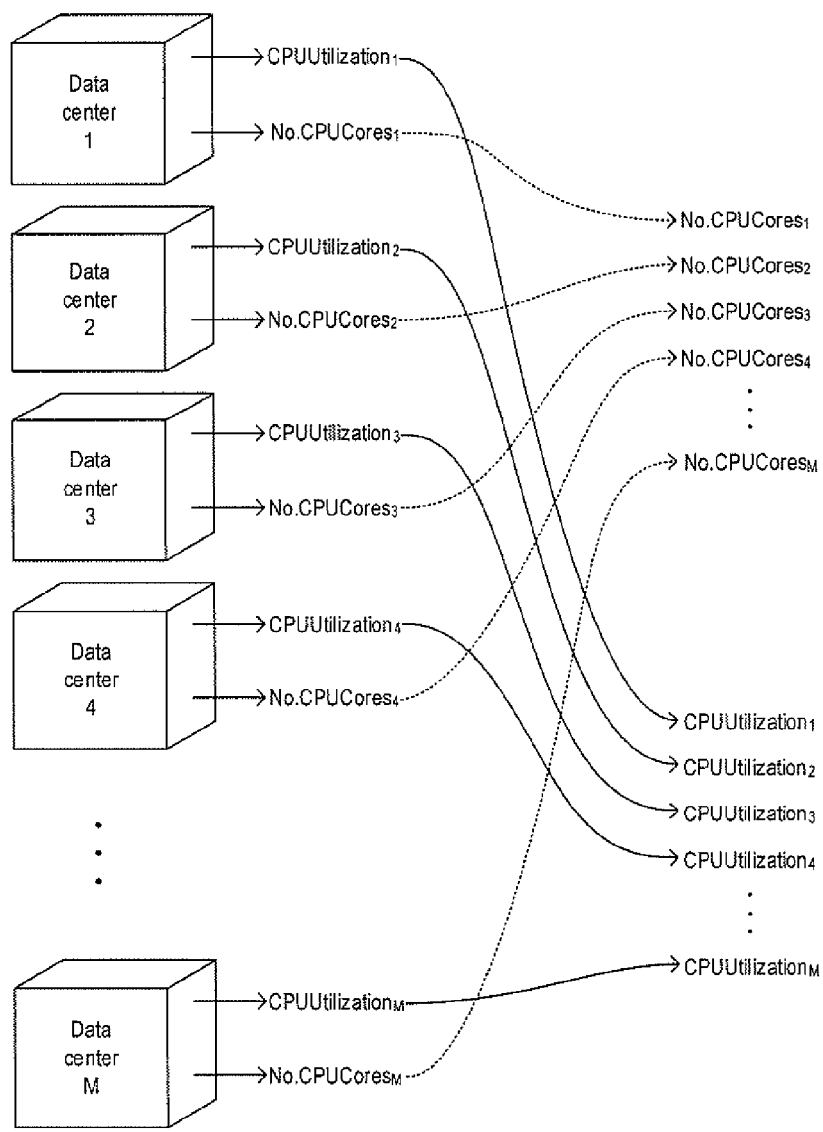
FIGS. 12A-12C show examples of preprocessing the resource utilization data produced by physical data centers.
Figure 12B:
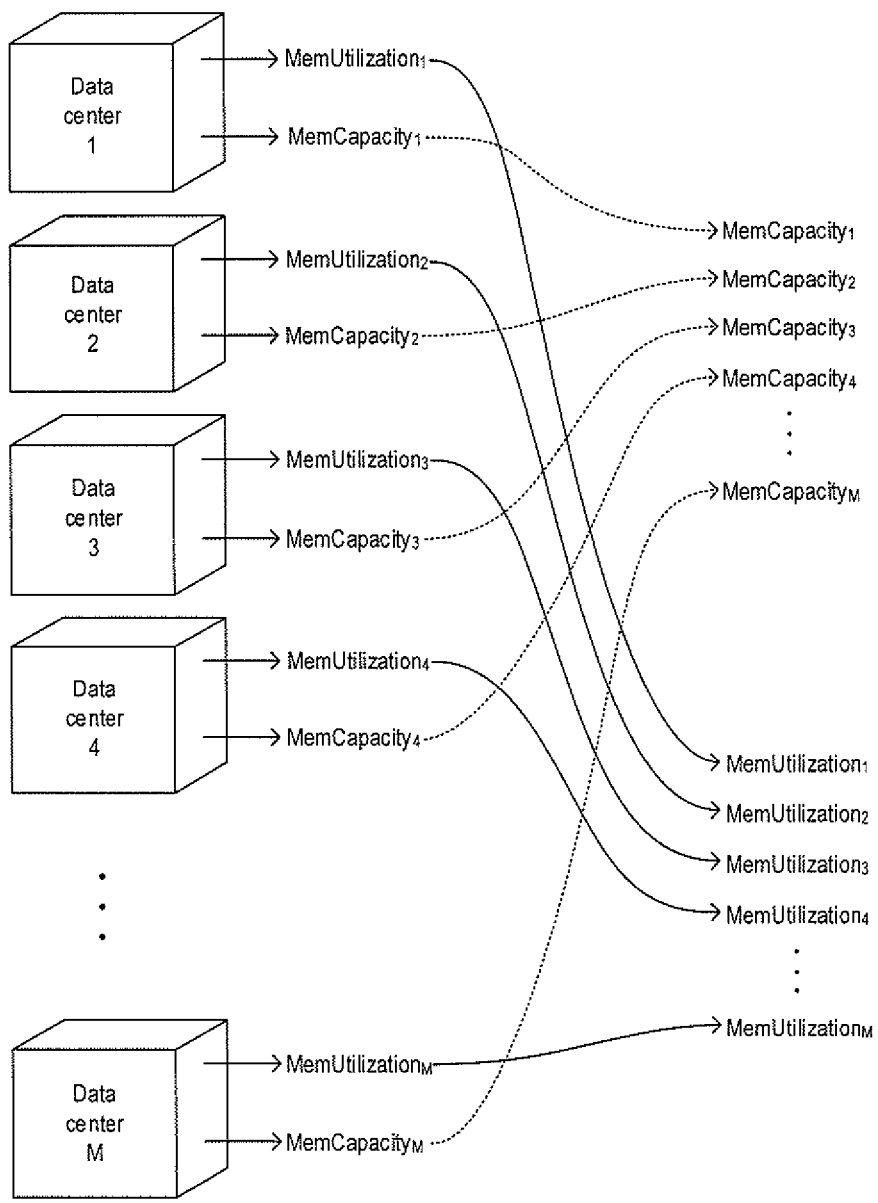
Figure 12C:
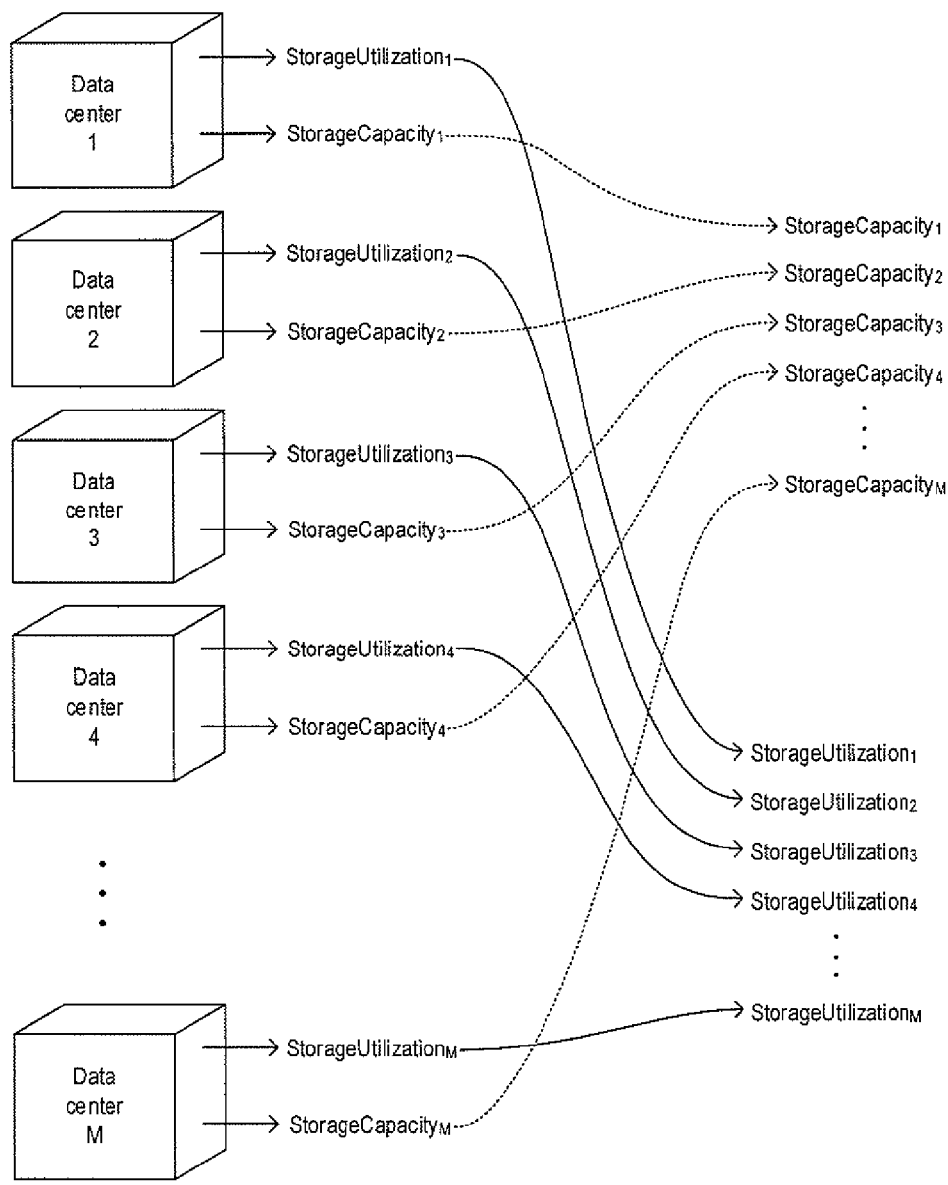

The resource utilization data and total VDC costs of the M physical data centers stored in the one or more data-storage devices 1104 are preprocessed to organize the resource utilization data and total VDC costs. The resource utilization data includes CPU utilization, number of CPU cores, memory utilization, memory capacity, storage utilization, and storage capacity for each of the data centers that collectively comprise a cloud computing industry resource utilization data. FIGS. 12A-12C show examples of preprocessing the resource utilization data produced by each of the M physical data centers. In the example of FIG. 12A, the number of CPU cores and CPU utilization of the VMs that run in the M physical data centers are collected. CPU utilization is the amount of time a CPU was used for processing instructions of one or more VMs. The number of CPU cores used by VMs run in the m-th data center are denoted by No.CPUCore$_m$ and the CPU utilization of the VMs that run in the m-th data center is denoted by CPUUtilization$_m$, where the index m=1, . . . , M. In the example of FIG. 12B, the memory utilization and memory capacity of each of the M data centers are collected. Memory includes any of various different kinds of random access memory ("RAM"). Memory capacity of the m-th data center is denoted by MemCapacity$_m$ and memory utilization of the m-th data center is denoted by MemUtilization$_m$. The MemCapacity$_m$ is the amount of memory available in the m-th data center and MemUtilization$_m$ is to the actual amount of memory used by the VMs that run in the m-th data center. In the example of FIG. 12C, the data storage utilization and data storage capacity of each of the M data centers are collected. The data storage capacity of the m-th data center is denoted by StorCapacity$_m$ and the data storage utilization of the m-th data center is denoted by StorUtilization$_m$. The StorCapacity$_m$ is the total amount of data storage available in the data-storage devices of the m-th data center, and StorUtilization$_m$ is to the amount of data storage used to store data generated by the VMs that run in the m-th data center.

The resource utilization data and total VDC costs of the M data centers may be used to calculate resource allocation cost industry benchmarks that may be compared with resource allocation costs of a data center, such as the data center 1103. Allocation cost refers to the VDC costs associated with running VMs, and unallocated costs refers to the VDC cost not associated with running VMs (e.g., unused hardware and unused labor).

CPU allocation cost industry benchmarks ("IBs") are computed as follows. A total CPU utilization of the M physical data centers is computed by summing the CPU utilization of each of the M physical data centers:

$$TotalCPUUtil(IB) = \sum_{m=1}^{M} CPUUtilization_m \quad (1)$$

A CPU allocation cost of the cloud computing industry may be computed as follows:

$$CPUAlloCost(IB) = TotalCPUUtil(IB) \times CPU\_base\_rate \quad (2)$$

where CPU_base_rate is the cost per unit of CPU utilization (e.g., dollars per unit of time).

The CPU allocation cost of Equation (2) is the cost of CPU utilization across the cloud computing industry. A total CPU capacity of the cloud computing industry may be computed as follows:

$$TotalCPUCap(IB) = \left(\sum_{m=1}^{M} No.CPUCores_m\right) \times CPU\_speed \quad (3)$$

where CPU_speed may be an average CPU speed per core.

A total CPU cost of the cloud computing industry may be computed from the total CPU capacity of Equation (3) and the CPU base rate as follows:

$$TotalCPUCost(IB) = TotalCPUCap(IB) \times CPU\_base\_rate \quad (4)$$

The total CPU cost of Equation (4) is the total cost of CPUs across of the cloud computing industry. The portion of cost allocated to CPU usage in the cloud computing industry to the total cost of CPU capacity in the cloud computing industry may be calculated as follows:

$$CPUAlloFrac(IB) = \frac{CPUAlloCost(IB)}{TotalCPUCost(IB)} \quad (5)$$

The CPU allocation fraction given by Equation (5) represents the fraction or proportion of total cost of CPUs in the cloud computing industry that is attributed to CPU allocated cost, which may also be represented as a percentage.

Figure 13:
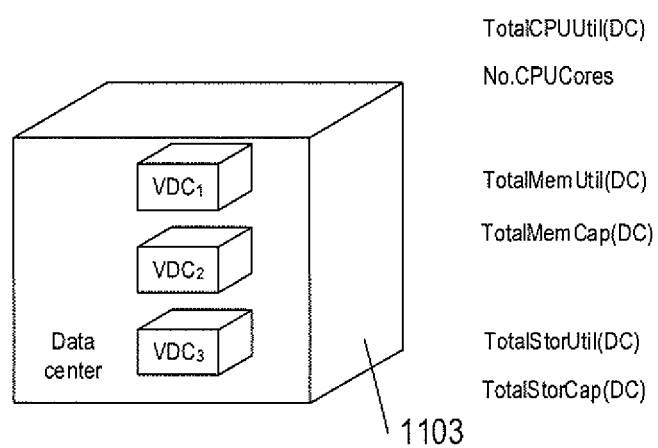
FIG. 13 shows a data center and associated resource costs.

The CPU allocation cost IBs computed in Equations (1)-(5) may be compared with associated CPU allocation costs of a data center, such as the data center 1103. FIG. 13 shows the data center 1103 and three VDCs. The total CPU utilization, TotalCPUUtil(DC), by the VMs comprising the three VDCs of the data center 1103 may be used to compute the CPU allocation cost for the data center 1103 as follows:

$$CPUAlloCost(DC) = TotalCPUUtil(DC) \times CPU\_base\_rate \quad (6)$$

The number of CPU cores in the data center 1103, No.C-PUCores(DC), may be used to compute the total CPU capacity of the data center 1103 as follows:

$$\text{TotalCPUCap(DC)} = \text{No.CPUCores(DC)} \times \text{CPU\_speed} \quad (7)$$

The total CPU total of the CPU cores in the data center 1103 may calculated as follows:

$$\text{TotalCPUCost(DC)} = \text{TotalCPUCap(DC)} \times \text{CPU\_base\_rate} \quad (8)$$

The fraction of cost allocated to CPU usage in the data center 1103 of the total cost of CPU capacity of the data center 1103 may be calculated as follows:

$$CPUAlloFrac(DC) = \frac{CPUAlloCost(DC)}{TotalCPUCost(DC)} \quad (9)$$

The CPU allocation fraction given by Equation (9) represents the fraction or proportion of total cost of CPUs in the data center 1103 that is attributed to CPU allocated cost, which may also be represented as a percentage.

The difference between the CPU allocation fraction of the data center 1103 given by Equation (9) and the CPU allocation fraction of the cloud computing industry given by Equation (5) is computed as follows:

$$\text{CPUAlloGap} = \text{CPUAlloFrac(IB)} - \text{CPUAlloFrac(DC)} \quad (10)$$

The CPU allocation gap of Equation (10) represents the degree to which cost attributed to CPU allocation in the data center 1103 differs from the cost attributed to CPU allocation across the cloud computing industry.

A CPU threshold, $T_{CPU}$, may be used to assess the degree to which CPU allocation cost in the data center 1103 are aligned with CPU allocation cost across the cloud computing industry. When $$|\text{CPUAlloGap}| \leq T_{CPU} \quad (11)$$

the cost attributed to CPU allocation in the data center 1103 is considered closely aligned with the cost attributed to CPU allocation across the cloud computing industry.

On the other hand, when $$|\text{CPUAlloGap}| > T_{CPU} \quad (12)$$

the cost attributed to CPU allocation in the data center 1103 is not considered closely aligned with the cost attributed to CPU allocation across the cloud computing industry. In this case, if CPUAlloGap>0, then investment in additional processors may be a next area of growth investment for the data center. If CPUAlloGap<0, then the investment in processors exceeds that of the cloud computing industry, which may be an indication of CPU wastage, and no further investment in processors should be made.

The monetary impact of the gap between the cost of CPU allocation of the data center 1103 and the cost of CPU allocation across the cloud computing industry may be computed as follows:

$$\text{MonetaryCPUAlloImpact} = \text{CPUAlloGap} \times \text{TotalCPUCost(DC)} \quad (13)$$

The monetary CPU allocation impact computed according to Equation (13) is a monetary value of the degree to which the cost of CPU allocation for the data center 1103 is less than or greater than the cost of CPU allocation for the cloud computing industry. MonetaryCPUAlloImpact<0 may be used as an indicator of CPU cost wastage, and MonetarCPUAlloImpact>0 may be used as an indicator of how much money should be invested in processors.

Memory allocation cost IBs are computed as follows. A total memory utilization of the M physical data centers is computed by summing the memory utilization of each of the M physical data centers:

$$TotalMemUtil(IB) = \sum_{m=1}^{M} MemUtilization_m \quad (14)$$

Memory allocation cost of the cloud computing industry may be computed as follows:

$$\text{MemAlloCost(IB)} = \text{MemTotalUtil(IB)} \times \text{Mem\_base\_rate} \quad (15)$$

where Mem_base_rate is the cost per number of bytes of memory (e.g., gigabytes). The memory allocation cost of Equation (15) is the cost of memory utilization across the cloud computing industry. A total memory capacity of the cloud computing industry may be computed summing the memory capacity of each of the M physical data centers as follows:

$$TotalMemCap(IB) = \sum_{m=1}^{M} MemCapacity_m \quad (16)$$

A total memory cost of the cloud computing industry may be computed from the total memory capacity of Equation (16) and the memory base rate as follows:

$$\text{TotalMemCost(IB)} = \text{TotalMemCap(IB)} \times \text{Mem\_base\_rate} \quad (17)$$

The total memory cost of Equation (17) is the total cost of memory across of the cloud computing industry. The portion of cost allocated to memory in the cloud computing industry to the total cost of memory capacity in the cloud computing industry may be calculated as follows:

$$MemAlloFrac(IB) = \frac{MemAlloCost(IB)}{TotalMemCost(IB)} \quad (18)$$

The memory allocation fraction given by Equation (18) represents the fraction or proportion of total cost of memory in the cloud computing industry that is attributed to memory allocation cost, which may also be represented as a percentage.

The memory allocation cost IBs computed in Equations (14)-(18) may be compared with associated memory allocation costs of a data center, such as the data center 1103. Returning to FIG. 13, the total memory utilization, TotalMemUtil(DC), by the VMs of the three VDCs running in the data center 1103 may be used to compute the memory allocation cost for the data center 1103 as follows:

$$\text{MemAlloCost(DC)} = \text{TotalMemUtil(DC)} \times \text{Mem\_base\_rate} \quad (19)$$

The amount of memory in the data center 1103, TotalMemCap(DC), may be used to compute the total memory cost associated with the data center 1103 as follows:

$$\text{TotalMemCost(DC)} = \text{TotalMemCap(DC)} \times \text{Mem\_base\_rate} \quad (20)$$

The fraction of cost allocated to memory usage in the data center 1103 of the total cost of memory capacity of the data center 1103 may be calculated as follows:

$$MemAlloFrac(DC) = \frac{MemAlloCost(DC)}{TotalMemCost(DC)} \quad (21)$$

The memory allocation fraction given by Equation (21) represents the fraction or proportion of total cost of memory in the data center 1103 that is attributed to memory allocation cost, which may also be represented as a percentage.

The difference between the memory allocation fraction of the data center 1103 given by Equation (21) and the memory allocation fraction of the cloud computing industry given by Equation (18) is computed as follows:

MemAlloGap=MemAlloFrac($BM$)−MemAlloFrac(DC) (22)

The memory allocation gap of Equation (22) represents the degree to which cost attributed to memory allocation in the data center 1103 differs from the cost attributed to memory allocation across the cloud computing industry.

A memory threshold, $T_{Mem}$, may be used to assess the degree to which memory allocation cost in the data center 1103 are aligned with memory allocation cost across the cloud computing industry. When

|MemAlloGap|≤$T_{Mem}$ (23)

the cost attributed to memory allocation in the data center 1103 is considered closely aligned with the cost attributed to memory allocation across the cloud computing industry. On the other hand, when

|MemAlloGap|>$T_{Mem}$ (24)

the cost attributed to memory allocation in the data center 1103 is not considered closely aligned with the cost attributed to memory allocation across the cloud computing industry. In this case, if MemAlloGap>0, then investment in additional memory may be a next area of growth investment for the data center. If MemAlloGap<0, then the investment in memory exceeds that of the cloud computing industry, which may be an indication of wastage, and no further investment in memory should be made.

The monetary impact of the gap between the cost of memory allocation of the data center 1103 and the cost of memory allocation across the cloud computing industry may be computed as follows:

MonetaryMemAlloImpact=MemAlloGap×TotalMemCost(DC) (25)

The monetary memory allocation impact computed according to Equation (25) is a monetary value of the degree to which the cost of memory allocation of the data center 1103 is less than or greater than the cost of memory allocation for the cloud computing industry. MonetaryMemAlloImpact<0 may be used as an indicator of memory wastage, and MonetaryMemAlloImpact>0 may be used as an indicator of how much money should be invested in memory.

Data storage allocation cost IBs are computed as follows. A total data storage utilization of the M physical data centers is computed by summing the data storage utilization of each of the M physical data centers:

$$TotalStorUtil(IB) = \sum_{m=1}^{M} StorUtilization_m \quad (26)$$

Data storage allocation cost of the cloud computing industry may be computed as follows:

StorAlloCost(IB)=TotalStorUtil(IB)×Stor_base_rate (27)

where Stor_base_rate is the cost per number of bytes of data storage (e.g., gigabytes).

The data storage allocation cost of Equation (15) is the cost of data storage utilization across the cloud computing industry. A total data storage capacity of the cloud computing industry may be computed summing the data storage capacity of each of the M physical data centers as follows:

$$TotalStorCap(IB) = \sum_{m=1}^{M} StorCapacity_m \quad (28)$$

A total data storage cost of the cloud computing industry may be computed from the total data storage capacity of Equation (16) and the data storage base rate as follows:

TotalStorCost(IB)=TotalStorCap(IB)×Stor_base_rate (29)

The total data storage cost of Equation (17) is the total cost of data storage across of the cloud computing industry. The portion of cost allocated to data storage in the cloud computing industry to the total cost of data storage capacity in the cloud computing industry may be calculated as follows:

$$StorAlloFrac(IB) = \frac{StorAlloCost(IB)}{TotalStorCost(IB)} \quad (30)$$

The data storage allocation fraction given by Equation (18) represents the fraction or proportion of total cost of data storage in the cloud computing industry that is attributed to data storage allocation cost, which may also be represented as a percentage.

The data storage allocation cost IBs computed in Equations (26)-(30) may be compared with associated data storage allocation costs of a data center, such as the data center 1103. Returning to FIG. 13, the total data storage utilization, TotalStorUtil(DC), by the VMs of the three VDCs running in the data center 1103 may be used to compute the data storage allocation cost for the data center 1103 as follows:

StorAlloCost(DC)=TotalStorUtil(DC)×Stor_base_rate (31)

The amount of data storage in the data center 1103, TotalStorCap(DC), may be used to compute the total data storage cost associated with the data center 1103 as follows:

TotalStorCost(DC)=TotalStorCap(DC)×Stor_base_rate (32)

The fraction of cost allocated to data storage usage in the data center 1103 of the total cost of data storage capacity of the data center 1103 may be calculated as follows:

$$StorAlloFrac(DC) = \frac{StorAlloCost(DC)}{TotalStorCost(DC)} \quad (33)$$

The data storage allocation fraction given by Equation (33) represents the fraction or proportion of total cost of data storage in the data center 1103 that is attributed to data storage allocation cost, which may also be represented as a percentage.

The difference between the data storage allocation fraction of the data center 1103 given by Equation (33) and the data storage allocation fraction of the cloud computing industry given by Equation (30) is computed as follows:

$$\text{StorAlloGap} = \text{StorAlloFrac(IB)} - \text{StorAlloFrac(DC)} \quad (34)$$

The data storage allocation gap of Equation (34) represents the degree to which cost attributed to data storage allocation in the data center 1103 differs from the cost attributed to data storage allocation across the cloud computing industry.

A storage threshold, $T_{Stor}$, may be used to assess the degree to which data storage allocation cost in the data center 1103 are aligned with data storage allocation cost across the cloud computing industry. For example, when $$|\text{StorAlloGap}| \leq T_{Stor} \quad (35)$$

the cost attributed to data storage allocation in the data center 1103 is considered closely aligned with the cost attributed to data storage allocation across the cloud computing industry. When $$|\text{StorAlloGap}| > T_{Stor} \quad (36)$$

the cost attributed to data storage allocation in the data center 1103 is not considered closely aligned with the cost attributed to data storage allocation across the cloud computing industry. In this case, if StorAlloGap>0, then investment in additional data storage may be a next area of growth investment for the data center. If StorAlloGap<0, then the investment in data storage exceeds that of the cloud computing industry, which may be an indication of wastage, and no further investment in data storage should be made.

The monetary impact of the gap between the cost of data storage allocation of the data center 1103 and the cost of data storage allocation across the cloud computing industry may be computed as follows:

$$\text{MonetaryStorAlloImpact} = \text{StorAlloGap} \times \text{TotalStorCost(DC)} \quad (37)$$

The monetary data storage allocation impact computed according to Equation (37) is a monetary value of the degree to which the cost of data storage allocation for the data center 1103 is less than or greater than the cost of data storage allocation for the cloud computing industry. MonetaryStorAlloImpact<0 may be used as an indicator of data storage wastage, and MonetarStorAlloImpact>0 may be used as an indicator of how much money should be invested in data storage.

A total resource allocation cost of CPUs, memory, data storage by the cloud computing industry may be calculated by summing the CPU allocation cost of Equation (6), the memory allocation cost of Equation (19), and the storage allocation cost (27) as follows:

$$\text{TotalAlloCost(IB)} = \text{CPUAlloCost(IB)} + \text{MemAlloCost(IB)} + \text{StorAlloCost(IB)} \quad (38)$$

A total resource allocation fraction for the cloud computing industry may be computed as follows:

$$\text{TotalAlloFrac(IB)} = \frac{\text{TotalAlloCost(IB)}}{\text{TotalVDCCost(IB)}} \quad (39)$$

where $$\text{TotalVDCCost(IB)} = \sum_{m=1}^{M} \text{TotalVDCCost}_m$$

and $\text{TotalVDCCost}_m$ is the total cost of one or more VDCs that run in the m-th physical data center.

A total resource allocation cost of CPUs, memory, and data storage for the data center 1103 may be calculated by summing the CPU allocation cost of Equation (6), the memory allocation cost of Equation (19), and the storage allocation cost (27) as follows:

$$\text{TotalAlloCost(DC)} = \text{CPUAlloCost(DC)} + \text{MemAlloCost(DC)} + \text{StorAlloCost(DC)} \quad (40)$$

A total resource allocation fraction for the data center 1103 may be computed as follows:

$$\text{TotalAlloFrac(DC)} = \frac{\text{TotalAlloCost(DC)}}{\text{TotalVDCCost(DC)}} \quad (41)$$

where TotalVDCCost(DC) is the total cost of the three VDCs that run in the m-th physical data center.

The difference between the resource allocation fraction of the data center 1103 given by Equation (33) and the resource allocation fraction of the cloud computing industry given by Equation (30) is computed as follows:

$$\text{TotalAlloGap} = \text{TotalAlloFrac(IB)} - \text{TotalAlloFrac(DC)} \quad (42)$$

The resource allocation gap of Equation (34) represents the degree to which cost attributed to resource allocation in the data center 1103 differs from the cost attributed to resource allocation across the cloud computing industry.

A total resource threshold, $T_{Tot}$, may be used to assess the degree to which resource allocation cost in the data center 1103 are aligned with resource allocation cost across the cloud computing industry. For example, when $$|\text{TotalAlloGap}| \leq T_{Tot} \quad (43)$$

the cost attributed to resource allocation in the data center 1103 is considered closely aligned with the cost attributed to resource allocation across the cloud computing industry. On the other hand, when $$|\text{TotalAlloGap}| > T_{Tot} \quad (44)$$

the cost attributed to resource allocation in the data center 1103 is not considered closely aligned with the cost attributed to resource allocation across the cloud computing industry.

The monetary impact of the gap between the cost of resource allocation of the data center 1103 and the cost of resource allocation across the cloud computing industry may be computed as follows:

$$\text{MonetaryTotalAlloImpact} = \text{TotalAlloGap} \times \text{TotalVDCCost(DC)} \quad (45)$$

The monetary data resource allocation impact computed according to Equation (45) is a monetary value of the degree to which the cost of resource allocation for the data center 1103 is less than or greater than the cost of resource allocation for the cloud computing industry.

Consider, for example, a cloud computing industry total allocation fraction of 0.60 or 60% (i.e., otalAlloFrac(IB) =0.60) computed according to Equation (39). Suppose total VDC cost for the data center 1103 is $1,000,000 (i.e., TotalVDCCost(DC)=$1,000,000) and total resource allocation cost for the VMs that run in the data center 1103 is $500,000 (i.e., TotalAlloCost(DC)=$500,000). The total resource allocation fraction for the data center 1103 computed according to Equation (41) is is 0.50 or 50% (i.e., TotalAlloFrac(DC)=0.50). The total resource allocation gap is 0.10 (i.e., TotalAlloGap=0.60–0.5=0.10). The monetary impact of the gap between the cost of resource allocation of the data center 1103 and the cost of resource allocation across the cloud computing industry is $100,000 (i.e. MonetaryTotalAlloImpact=0.10×$1,000,000=$100,000).

Figure 14:
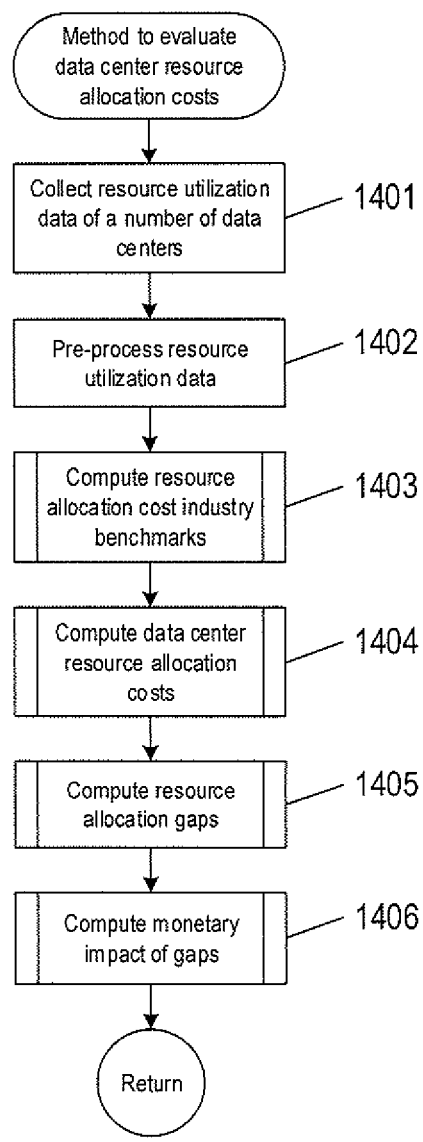
FIG. 14 shows a control-flow diagram of a method to evaluate data center resource allocation costs of a data center.

FIG. 14 shows a control-flow diagram of a method to evaluate data center resource allocation costs of a data center. In block 1401, resource utilization data is collected from a number of data centers that represents a cloud computing industry as described above with reference to FIG. 11. The resources may be computational resources, such as CPU's, memory, and data storage, of the data centers. The resource utilization data includes CPU utilization, number of CPU cores, memory utilization, memory capacity, storage utilization, and storage capacity for each of the data centers that collectively comprise a cloud computing industry resource utilization data, as described above with reference to FIGS. 12A-12C. In block 1402, the resource utilization data are pre-processed by sorted according to the type of resource, as described above with reference to FIGS. 12A-12C. In block 1403, a routine "compute resource allocation cost of industry benchmarks" is called to compute resource allocated costs for the data centers that are representative of the cloud computing industry. In block 1404, a routine "compute data center resource allocation costs" is called to resource allocations for the resources of the data center. In block 1405, a routine "compute resource allocation gaps" is called to compute gaps between resource allocation of the data center and the cloud computing industry. In block 1406, a routine "compute monetary impact of gaps" is called to compute the monetary impact of the resource allocation gaps computed in block 1405.

Figure 15:
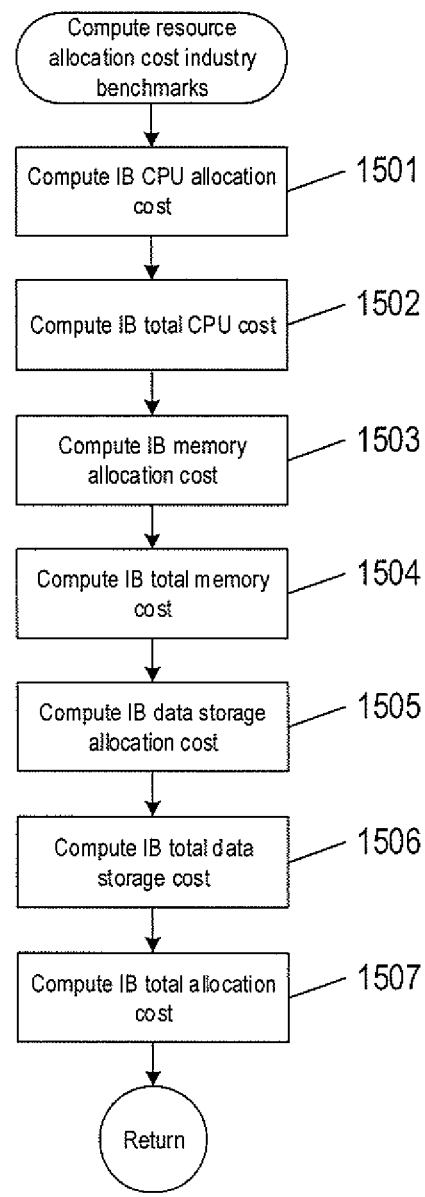
FIG. 15 shows a control-flow diagram of the method "compute resource allocation cost of industry benchmarks" called in FIG. 14.

FIG. 15 shows a control-flow diagram of the method "compute resource allocation cost of industry benchmarks" called in block 1403 of FIG. 14. In block 1501, a CPU allocation cost is computed as described above with reference to Equations (1) and (2). In block 1502, a total CPU cost is computed as described above with reference to Equations (3). In block 1503, memory allocation cost is computed as described above with reference to Equations (14) and (15). In block 1504, total memory cost is computed as described above with reference to Equations (16) and (17). In block 1505, data storage allocation cost is computed as described above with reference to Equations (26) and (27). In block 1506, total data storage cost is computed as described above with reference to Equations (28) and (29). In block 1507, a total resource allocation cost is computed from the allocation cost computed in blocks 1501, 1503, and 1505, as described above with reference to Equation (38).

Figure 16:
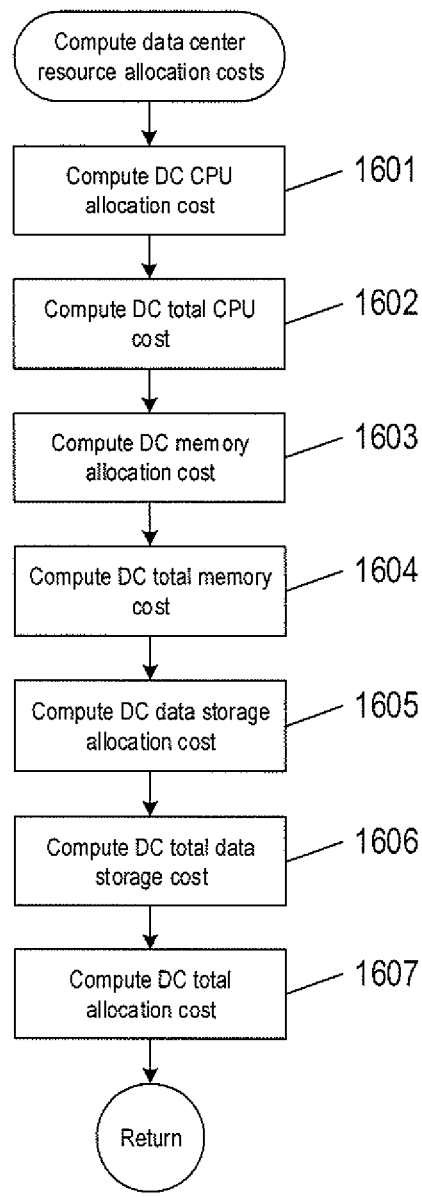
FIG. 16 shows a control-flow diagram of the method "compute data center resource allocation costs" called in FIG. 14.

FIG. 16 shows a control-flow diagram of the method "compute data center resource allocation costs" called in block 1404 of FIG. 14. In block 1601, a CPU allocation cost is computed as described above with reference to Equation (6). In block 1602, a total CPU cost is computed as described above with reference to Equations (8). In block 1603, memory allocation cost is computed as described above with reference to Equation (19). In block 1604, a total memory cost is computed as described above with reference to Equation (20). In block 1605, data storage allocation cost is computed as described above with reference to Equation (31). In block 1606, total data storage cost is computed as described above with reference to Equation (32). In block 1607, a total resource allocation cost is computed from the allocation cost computed in blocks 1601, 1603, and 1605, as described above with reference to Equation (40).

Figure 17A:
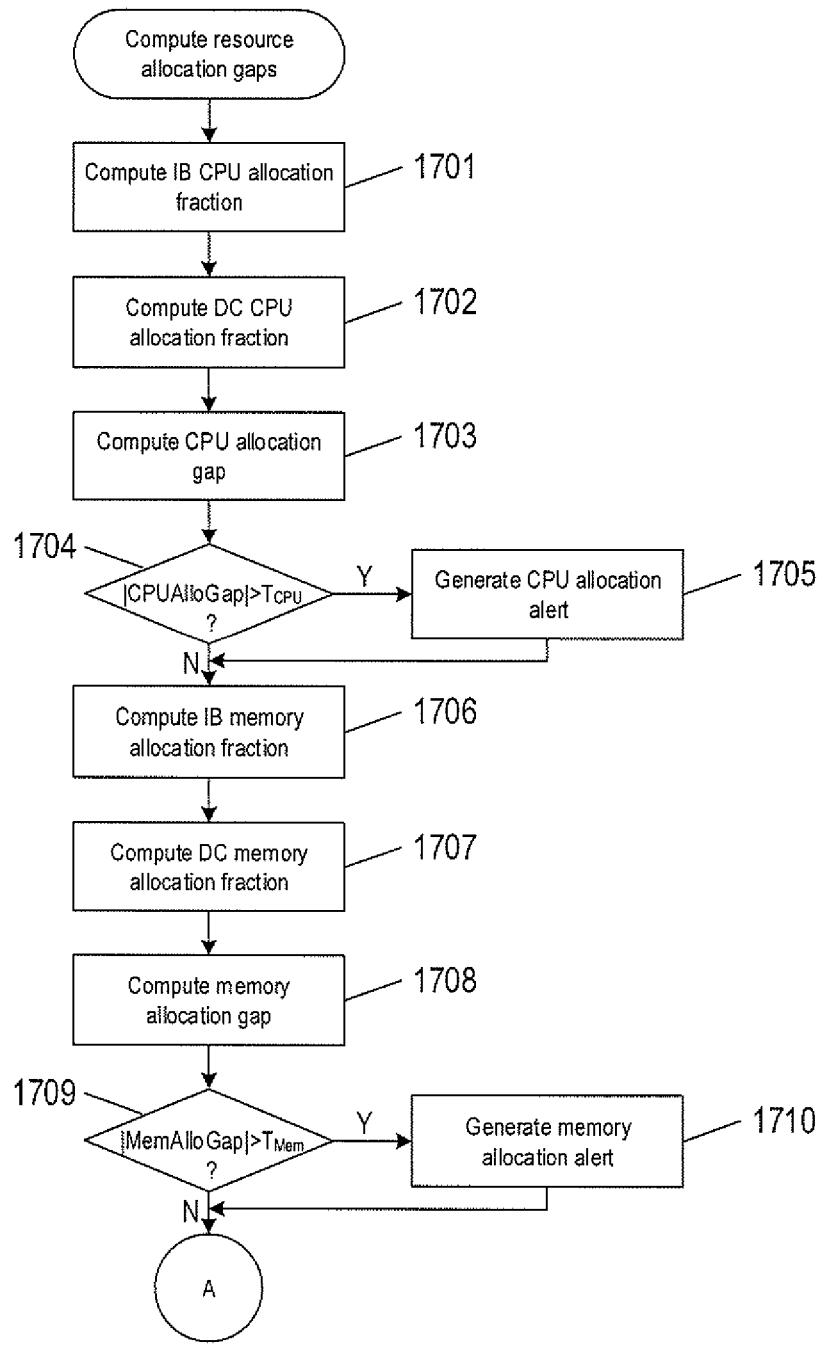
FIGS. 17A-17B show a control-flow diagram of the method "compute resource allocation gaps" called in FIG. 14.
Figure 17B:
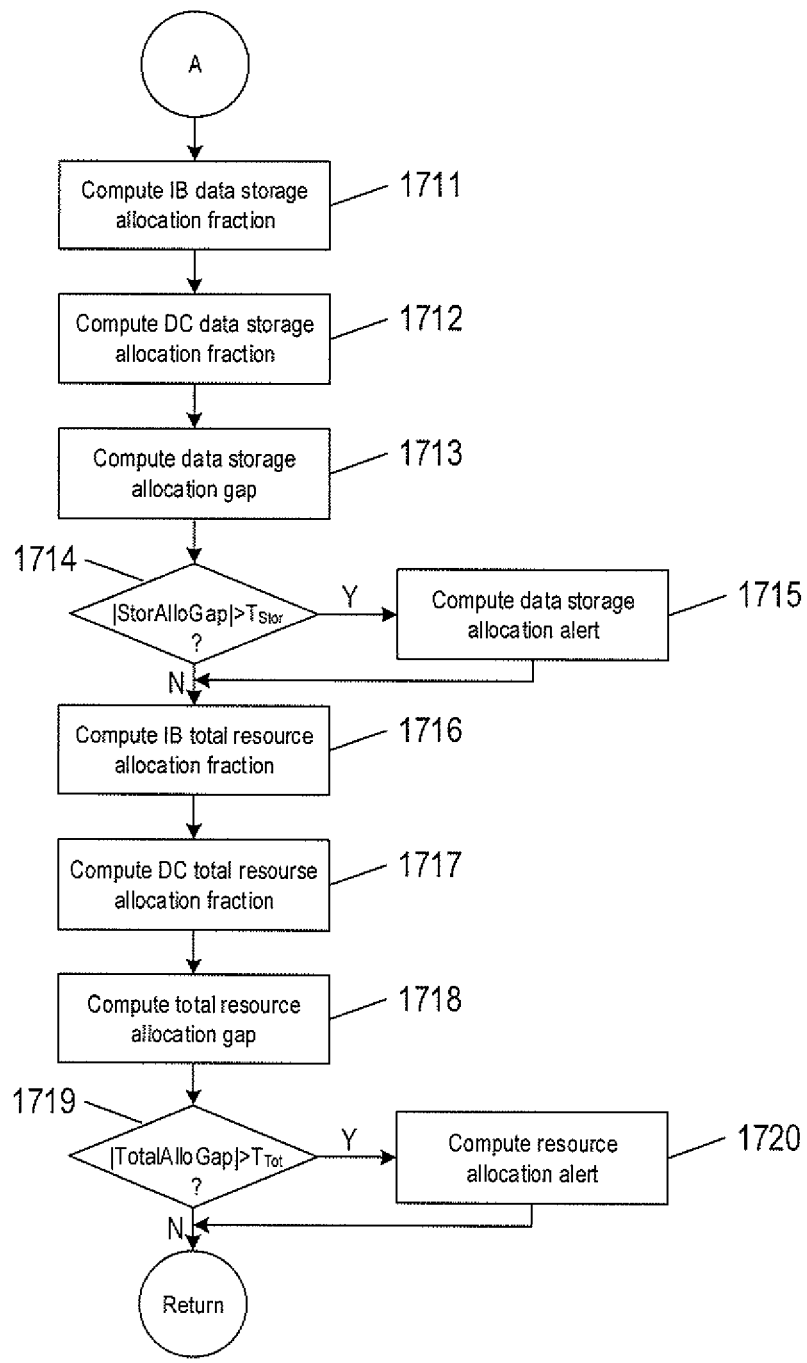

FIGS. 17A-17B show a control-flow diagram of the method "compute resource allocation gaps" called in block 1405 of FIG. 14. In block 1701, a CPU allocation fraction is computed for the cloud computing industry according to Equation (5) based on the CPU allocation cost and the total CPU cost computed in corresponding blocks 1501 and 1502 of FIG. 15. In block 1702, a CPU allocation fraction is computed for the data center according to Equation (9) based on the CPU allocation cost and the total CPU cost computed in corresponding blocks 1601 and 1602 of FIG. 16. In block 1703, a CPU allocation gap between the CPU allocation fractions computed in blocks 1701 and 1702 is computed as described above with reference to Equation (10). In decision block 1704, the absolute value of the CPU allocation gap is greater than a CPU threshold, as described above with reference to Equation (12), control flows to block 1705. Otherwise, control flows to block 1706. In block 1705, an alert is generated that indicates CPU allocation costs are not aligned with CPU allocation cost of the cloud computing industry. In block 1706, a memory allocation fraction is computed for the cloud computing industry according to Equation (18) based on the memory allocation cost and the total memory cost computed in corresponding blocks 1503 and 1504 of FIG. 15. In block 1707, a memory allocation fraction is computed for the data center according to Equation (21) based on the memory allocation cost and the total memory cost computed in corresponding blocks 1603 and 1604 of FIG. 16. In block 1708, a memory allocation gap between the memory allocation fractions computed in blocks 1706 and 1707 is computed as described above with reference to Equation (22). In decision block 1709, the absolute value of the memory allocation gap is greater than a memory threshold, as described above with reference to Equation (24), control flows to block 1710. Otherwise, control flows to block 1711. In block 1710, an alert is generated that indicates memory allocation costs are not aligned with memory allocation cost of the cloud computing industry. In block 1711, a data storage allocation fraction is computed for the cloud computing industry according to Equation (30) based on the data storage allocation cost and the total data storage cost computed in corresponding blocks 1505 and 1506 of FIG. 15. In block 1712, a data storage allocation fraction is computed for the data center according to Equation (33) based on the data storage allocation cost and the total data storage cost computed in corresponding blocks 1605 and 1606 of FIG. 16. In block 1713, a data storage allocation gap between the data storage allocation fractions computed in blocks 1711 and 1712 is computed as described above with reference to Equation (34). In decision block 1714, the absolute value of the data storage allocation gap is greater than a data storage threshold, as described above with reference to Equation (36), control flows to block 1715. Otherwise, control flows to block 1716. In block 1715, an alert is generated that indicates data storage allocation costs are not aligned with data storage allocation cost of the cloud computing industry. In block 1716, a total resource allocation fraction is computed as described above with reference to Equation (39) based on the total resource allocation cost computed in 1507 of FIG. 15 and the total VDC cost of the cloud computing industry. In block 1717, a total resource allocation fraction is computed as described above with reference to Equation (41) based on the total resource allocation cost computed in 1607 of FIG. 16 and the total VDC cost of the data center. In block 1718, a total resource allocation gap is computed based on the total resource allocation fractions computed in blocks 1716 and 1717 as described above with reference to Equation (42). In decision block 1719, when the absolute value of the total resource allocation gap is greater than a total resource threshold as described above with reference to Equation (44) control flows to block 1720. In block 1720, an alert is generate that indicates the total resource allocation cost is not aligned with total resource allocation cost of the cloud computing industry.

Figure 18:
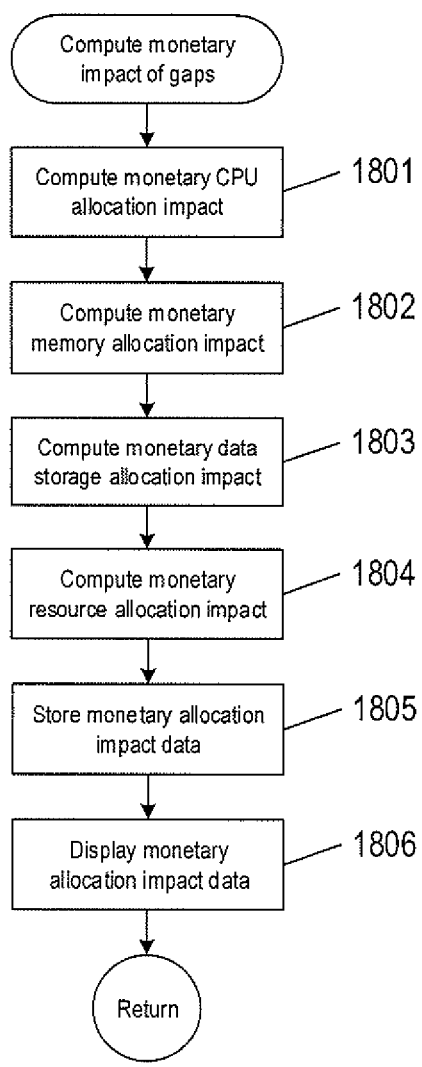
FIG. 18 shows a control-flow diagram of the method "compute monetary impact of gaps" called in FIG. 14.

FIG. 18 shows a control-flow diagram of the method "compute monetary impact of gaps" called in block 1406 of FIG. 14. In block 1801, a monetary CPU allocation impact is computed as described above with reference to Equation (13). In block 1802, a monetary memory allocation impact is computed as described above with reference to Equation (25). In block 1803, a monetary data storage allocation impact is computed as described above with reference to Equation (37). In block 1804, a monetary data resource allocation impact is computed as described above with reference to Equation (45). In blocks 1805 and 1806, the monetary allocation impact data computed in blocks 1801-1804 are stored and may be displayed for viewing, such as displaying on a monitor or other display device.

The methods described above with reference to FIGS. 14-18 may be encoded in machine-readable instructions stored in one or more data-storage devices of a programmable computer, such as the computer described above with reference to FIG. 1.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method executed using one or more processors of a computing environment to evaluate resource allocation costs of a data center, the method comprising:
    collecting resource utilization data of a cloud computing industry, the cloud computing industry comprising a plurality of virtual machines (VMs) executed by a plurality of servers, the resource utilization data sent by a plurality of connectors distributed across multiple clouds;
    computing resource allocation cost industry benchmarks of the cloud computing industry based on the resource utilization data of the plurality of VMs executed by the plurality of servers;
    computing resource allocation costs of the data center based on resource utilization of data center resources of a portion of the plurality of VMs executed by the plurality of servers, the portion of the plurality of VMs being executed by a portion of the plurality of servers within the data center;
    computing resource allocation gaps between the resource allocation cost industry benchmarks and the resource allocation costs of the data center;
    computing monetary impact of the resource allocation gaps between the resource allocation cost industry benchmarks and the resource allocation costs of the data center; and
    storing the resource allocation costs, the resource allocation gaps, and the monetary impact in one or more data storage devices.

2. The method of claim 1, wherein the resources further comprise central processing units ("CPUs"), memory, and data storage.

3. The method of claim 1, wherein computing the resource allocation cost industry benchmarks of the cloud computing industry further comprises:
    computing CPU allocation cost industry benchmark based on a total CPU utilization of CPUs in the cloud computing industry;
    computing total CPU cost industry benchmark based on a total CPU capacity of the cloud computing industry;
    computing memory allocation cost industry benchmark based on a total memory utilization of memory in the cloud computing industry;
    computing total memory allocation cost industry benchmark based on a total memory capacity of the cloud computing industry;
    computing data storage allocation cost industry benchmark based on a total data storage utilization of data storage in the cloud computing industry;
    computing data storage cost industry benchmark based on a total data storage capacity of the cloud computing industry; and
    computing total allocation cost industry benchmark as a sum of the CPU, memory, and data storage allocation costs.

4. The method of claim 1, wherein computing the resource allocation costs of the data center further comprises:
    computing CPU allocation cost based on a total CPU utilization of CPUs in data center;
    computing total CPU cost based on a total CPU capacity of the data center;
    computing memory allocation cost based on a total memory utilization of memory in the data center;
    computing total memory allocation cost based on a total memory capacity of the data center;
    computing data storage allocation cost based on a total data storage utilization of data storage in the data center;
    computing data storage cost based on a total data storage capacity of the data center; and
    computing total allocation cost as a sum of the CPU, memory, and data storage allocation costs.

5. The method of claim 1, wherein computing the resource allocation gaps further comprises:
    computing CPU allocation fraction industry benchmark as a ratio of CPU allocation cost and total CPU cost of the cloud computing industry;
    computing CPU allocation fraction of the data center as a ratio of CPU allocation cost and total CPU cost of the data center;
    computing CPU allocation gap as a difference between the CPU allocation fraction cloud computing industry benchmark and the CPU allocation faction of the data center;
    computing memory allocation fraction industry benchmark as a ratio of memory allocation cost and total memory cost of the cloud computing industry;
    computing memory allocation fraction of the data center as a ratio of memory allocation cost and total memory cost of the data center;
    computing memory allocation gap as a difference between the memory allocation fraction cloud computing industry benchmark and the memory allocation faction of the data center;

computing data storage allocation fraction industry benchmark as a ratio of data storage allocation cost and total data storage cost of the cloud computing industry;

computing data storage allocation fraction of the data center as a ratio of data storage allocation cost and total data storage cost of the data center; and computing data storage allocation gap as a difference between the data storage allocation fraction cloud computing industry benchmark and the data storage allocation faction of the data center.

6. The method of claim 5, further comprises:

when an absolute value of the CPU allocation gap is greater than a CPU threshold, generating a CPU allocation alert;

when an absolute value of the memory allocation gap is greater than a memory threshold, generating a memory allocation alert; and when an absolute value of the data storage allocation gap is greater than a data storage threshold, generating a data storage allocation alert.

7. The method of claim 1, wherein computing the resource allocation gaps further comprises:

computing total resource allocation fraction industry benchmark as a ratio of a total resource allocation cost and total virtual data center cost of the cloud computing industry;

computing total resource allocation fraction of the data center as a ratio of a total resource allocation cost and total virtual data center cost of the data center; and computing total resource allocation gap as a difference between the total resource allocation fraction industry benchmark and the total resource allocation faction of the data center.

8. The method of claim 7, further comprises when an absolute value of the total resource allocation gap is greater than a total resource threshold, generating a total resource allocation alert.

9. The method of claim 1, wherein computing the monetary impact of the resource allocation gaps further comprises:

computing a monetary CPU allocation impact as a product of a CPU allocation gap and a total CPU cost for the data center;

computing a monetary memory allocation impact as a product of a memory allocation gap and the total memory cost for the data center;

computing a data storage allocation impact as a product of a data storage allocation gap and a total storage cost for the data center; and computing a total resource allocation impact as a product of a total allocation gap and total virtual data center cost of the data center.

10. A system comprising:

one or more processors;

one or more data-storage devices; and machine-readable instructions stored in the data-storage devices and executed using the one or more processors, the machine-readable instructions collecting resource utilization data of a cloud computing industry, the cloud computing industry comprising a plurality of virtual machines (VMs) executed by a plurality of servers, the resource utilization data sent by a plurality of connectors distributed across multiple clouds;

computing resource allocation cost industry benchmarks of the cloud computing industry based on the resource utilization data of the plurality of VMs executed by the plurality of servers;

computing resource allocation costs of the data center based on resource utilization of data center resources of a portion of the plurality of VMs executed by the plurality of servers, the portion of the plurality of VMs being executed by a portion of the plurality of servers within the data center;

computing resource allocation gaps between the resource allocation cost industry benchmarks and the resource allocation costs of the data center;

computing monetary impact of the resource allocation gaps between the resource allocation cost industry benchmarks and the resource allocation costs of the data center; and storing the resource allocation costs, the resource allocation gaps, and the monetary impact in the one or more data storage devices.

11. The system of claim 10, wherein the resources further comprise central processing units ("CPUs"), memory, and data storage.

12. The system of claim 10, wherein computing the resource allocation cost industry benchmarks of the cloud computing industry further comprises:

computing CPU allocation cost industry benchmark based on a total CPU utilization of CPUs in the cloud computing industry;

computing total CPU cost industry benchmark based on a total CPU capacity of the cloud computing industry;

computing memory allocation cost industry benchmark based on a total memory utilization of memory in the cloud computing industry;

computing total memory allocation cost industry benchmark based on a total memory capacity of the cloud computing industry;

computing data storage allocation cost industry benchmark based on a total data storage utilization of data storage in the cloud computing industry;

computing data storage cost industry benchmark based on a total data storage capacity of the cloud computing industry; and computing total allocation cost industry benchmark as a sum of the CPU, memory, and data storage allocation costs.

13. The system of claim 10, wherein computing the resource allocation costs of the data center further comprises:

computing CPU allocation cost based on a total CPU utilization of CPUs in data center;

computing total CPU cost based on a total CPU capacity of the data center;

computing memory allocation cost based on a total memory utilization of memory in the data center;

computing total memory allocation cost based on a total memory capacity of the data center;

computing data storage allocation cost based on a total data storage utilization of data storage in the data center;

computing data storage cost based on a total data storage capacity of the data center; and computing total allocation cost as a sum of the CPU, memory, and data storage allocation costs.

14. The system of claim 10, wherein computing the resource allocation gaps further comprises:

computing CPU allocation fraction industry benchmark as a ratio of CPU allocation cost and total CPU cost of the cloud computing industry;

computing CPU allocation fraction of the data center as a ratio of CPU allocation cost and total CPU cost of the data center;
computing CPU allocation gap as a difference between the CPU allocation fraction cloud computing industry benchmark and the CPU allocation faction of the data center;
computing memory allocation fraction industry benchmark as a ratio of memory allocation cost and total memory cost of the cloud computing industry;
computing memory allocation fraction of the data center as a ratio of memory allocation cost and total memory cost of the data center;
computing memory allocation gap as a difference between the memory allocation fraction cloud computing industry benchmark and the memory allocation faction of the data center;
computing data storage allocation fraction industry benchmark as a ratio of data storage allocation cost and total data storage cost of the cloud computing industry;
computing data storage allocation fraction of the data center as a ratio of data storage allocation cost and total data storage cost of the data center; and
computing data storage allocation gap as a difference between the data storage allocation fraction cloud computing industry benchmark and the data storage allocation faction of the data center.

15. The system of claim 14, further comprises:
when an absolute value of the CPU allocation gap is greater than a CPU threshold, generating a CPU allocation alert;
when an absolute value of the memory allocation gap is greater than a memory threshold, generating a memory allocation alert; and
when an absolute value of the data storage allocation gap is greater than a data storage threshold, generating a data storage allocation alert.

16. The system of claim 10, wherein computing the resource allocation gaps further comprises:
computing total resource allocation fraction industry benchmark as a ratio of a total resource allocation cost and total virtual data center cost of the cloud computing industry;
computing total resource allocation fraction of the data center as a ratio of a total resource allocation cost and total virtual data center cost of the data center; and
computing total resource allocation gap as a difference between the total resource allocation fraction industry benchmark and the total resource allocation faction of the data center.

17. The system of claim 16, further comprises when an absolute value of the total resource allocation gap is greater than a total resource threshold, generating a total resource allocation alert.

18. The system of claim 10, wherein computing the monetary impact of the resource allocation gaps further comprises:
computing a monetary CPU allocation impact as a product of a CPU allocation gap and a total CPU cost for the data center;
computing a monetary memory allocation impact as a product of a memory allocation gap and the total memory cost for the data center;
computing a data storage allocation impact as a product of a data storage allocation gap and a total storage cost for the data center; and
computing a total resource allocation impact as a product of a total allocation gap and total virtual data center cost of the data center.

19. A non-transitory computer-readable medium encoded with machine-readable instructions that implement a method carried out by one or more processors of a computer system to perform the operations of
collecting resource utilization data of a cloud computing industry, the cloud computing industry comprising a plurality of servers configured to execute a plurality of virtual machines (VMs), the resource utilization data comprising utilization of the VMs sent by a plurality of connectors distributed across multiple clouds;
computing resource allocation cost industry benchmarks of the cloud computing industry based on the resource utilization data of the plurality of VMs executed by the plurality of servers;
computing resource allocation costs of the data center based on resource utilization of data center resources of a portion of the plurality of VMs executed by the plurality of servers, the portion of the plurality of VMs being executed by a portion of the plurality of servers within the data center;
computing resource allocation gaps between the resource allocation cost industry benchmarks and the resource allocation costs of the data center;
computing monetary impact of the resource allocation gaps between the resource allocation cost industry benchmarks and the resource allocation costs of the data center; and
storing the resource allocation costs, the resource allocation gaps, and the monetary impact in the one or more data storage devices.

20. The medium of claim 19, wherein the resources further comprise central processing units ("CPUs"), memory, and data storage.

21. The medium of claim 19, wherein computing the resource allocation cost industry benchmarks of the cloud computing industry further comprises:
computing CPU allocation cost industry benchmark based on a total CPU utilization of CPUs in the cloud computing industry;
computing total CPU cost industry benchmark based on a total CPU capacity of the cloud computing industry;
computing memory allocation cost industry benchmark based on a total memory utilization of memory in the cloud computing industry;
computing total memory allocation cost industry benchmark based on a total memory capacity of the cloud computing industry;
computing data storage allocation cost industry benchmark based on a total data storage utilization of data storage in the cloud computing industry;
computing data storage cost industry benchmark based on a total data storage capacity of the cloud computing industry; and
computing total allocation cost industry benchmark as a sum of the CPU, memory, and data storage allocation costs.

22. The medium of claim 19, wherein computing the resource allocation costs of the data center further comprises:
computing CPU allocation cost based on a total CPU utilization of CPUs in data center;
computing total CPU cost based on a total CPU capacity of the data center;

computing memory allocation cost based on a total memory utilization of memory in the data center;

computing total memory allocation cost based on a total memory capacity of the data center;

computing data storage allocation cost based on a total data storage utilization of data storage in the data center;

computing data storage cost based on a total data storage capacity of the data center; and computing total allocation cost as a sum of the CPU, memory, and data storage allocation costs.

23. The medium of claim 19, wherein computing the resource allocation gaps further comprises:

computing CPU allocation fraction industry benchmark as a ratio of CPU allocation cost and total CPU cost of the cloud computing industry;

computing CPU allocation fraction of the data center as a ratio of CPU allocation cost and total CPU cost of the data center;

computing CPU allocation gap as a difference between the CPU allocation fraction cloud computing industry benchmark and the CPU allocation faction of the data center;

computing memory allocation fraction industry benchmark as a ratio of memory allocation cost and total memory cost of the cloud computing industry;

computing memory allocation fraction of the data center as a ratio of memory allocation cost and total memory cost of the data center;

computing memory allocation gap as a difference between the memory allocation fraction cloud computing industry benchmark and the memory allocation faction of the data center;

computing data storage allocation fraction industry benchmark as a ratio of data storage allocation cost and total data storage cost of the cloud computing industry;

computing data storage allocation fraction of the data center as a ratio of data storage allocation cost and total data storage cost of the data center; and computing data storage allocation gap as a difference between the data storage allocation fraction cloud computing industry benchmark and the data storage allocation faction of the data center.

24. The medium of claim 23, further comprises:

when an absolute value of the CPU allocation gap is greater than a CPU threshold, generating a CPU allocation alert;

when an absolute value of the memory allocation gap is greater than a memory threshold, generating a memory allocation alert; and when an absolute value of the data storage allocation gap is greater than a data storage threshold, generating a data storage allocation alert.

25. The medium of claim 19, wherein computing the resource allocation gaps further comprises:

computing total resource allocation fraction industry benchmark as a ratio of a total resource allocation cost and total virtual data center cost of the cloud computing industry;

computing total resource allocation fraction of the data center as a ratio of a total resource allocation cost and total virtual data center cost of the data center; and computing total resource allocation gap as a difference between the total resource allocation fraction industry benchmark and the total resource allocation faction of the data center.

26. The medium of claim 25, further comprises when an absolute value of the total resource allocation gap is greater than a total resource threshold, generating a total resource allocation alert.

27. The medium of claim 19, wherein computing the monetary impact of the resource allocation gaps further comprises:

computing a monetary CPU allocation impact as a product of a CPU allocation gap and a total CPU cost for the data center;

computing a monetary memory allocation impact as a product of a memory allocation gap and the total memory cost for the data center;

computing a data storage allocation impact as a product of a data storage allocation gap and a total storage cost for the data center; and computing a total resource allocation impact as a product of a total allocation gap and total virtual data center cost of the data center.

* * * * *